(12) United States Patent
Patel et al.

(10) Patent No.: US 12,141,720 B2
(45) Date of Patent: Nov. 12, 2024

(54) MIXTURE QUERIES FOR SEARCH ENGINE PORTALS

(71) Applicant: Kayak Software Corporation, Stamford, CT (US)

(72) Inventors: Snehal Patel, Carlisle, MA (US); Gabriel Pelaez, Quincy, MA (US); Eric Miozza, Taunton, MA (US); Giorgos Zacharia, Winchester, MA (US)

(73) Assignee: KAYAK Software Corporation, Stamford, CT (US)

( * ) Notice: Subject to any disclaimer, the term of this patent is extended or adjusted under 35 U.S.C. 154(b) by 0 days.

(21) Appl. No.: 17/663,173

(22) Filed: May 12, 2022

(65) Prior Publication Data

US 2022/0343224 A1    Oct. 27, 2022

Related U.S. Application Data

(63) Continuation of application No. 15/595,438, filed on May 15, 2017, now abandoned.

(51) Int. Cl.
*G06Q 10/00* (2023.01)
*G06F 16/9535* (2019.01)
*G06Q 10/02* (2012.01)
*G06Q 10/1093* (2023.01)
*G06Q 50/12* (2012.01)

(52) U.S. Cl.
CPC ......... *G06Q 10/02* (2013.01); *G06F 16/9535* (2019.01); *G06Q 10/1095* (2013.01); *G06Q 50/12* (2013.01)

(58) Field of Classification Search
USPC .......................................................... 705/5
See application file for complete search history.

(56) References Cited

U.S. PATENT DOCUMENTS

| 4,101,056 | A  | * | 7/1978 | Mattimoe | ............. | B67D 7/228 |
| | | | | | | 222/26 |
| 7,584,110 | B2 | * | 9/2009 | Robertson | ............. | G06Q 10/00 |
| | | | | | | 235/375 |

(Continued)

OTHER PUBLICATIONS

Istanbul—Trip Advisor First time visitor—stay in one place or split stay? URL: https://www.tripadvisor.com/ShowTopic-g293974-i368-k8114453-First_time_visitor_stay_in_one_place_or_split_stay-Istanbul.html (Year: 2015).*

(Continued)

*Primary Examiner* — Tonya Joseph
(74) *Attorney, Agent, or Firm* — Lee & Hayes, P.C.

(57) ABSTRACT

Approaches to improving mixture queries and booking split stays are described herein. According to some aspects, a user utilizes an exploration tool to search for available lodging. A mixture query is generated based on the stay information received from the user and potential split stays are identified and presented to the user. In some aspects, the split stays are identified based on user-specified split stay criteria, search results are obtained from a local database of "live" pricing and availability information, and a selected split stay option is booked on behalf of the user. Example split stay criteria includes criteria pertaining to an amenity or characteristic of the available lodgings or the available rooms.

20 Claims, 9 Drawing Sheets

(56) References Cited

U.S. PATENT DOCUMENTS

| | | | |
|---|---|---|---|
| 2006/0031763 A1* | 2/2006 | Yeung | G06F 16/252 |
| | | | 715/236 |
| 2007/0016608 A1* | 1/2007 | Mullins | G06F 16/289 |
| 2007/0150617 A1* | 6/2007 | Hariki | H04M 1/72406 |
| | | | 709/246 |
| 2009/0030743 A1 | 1/2009 | Tussy | |
| 2009/0234682 A1* | 9/2009 | Baggett | G06Q 10/02 |
| | | | 707/E17.014 |
| 2009/0254525 A1* | 10/2009 | Srinivasan | G06F 16/252 |
| 2009/0287513 A1 | 11/2009 | Anderson et al. | |
| 2009/0300547 A1* | 12/2009 | Bates | G06F 16/954 |
| | | | 707/999.005 |
| 2010/0305981 A1* | 12/2010 | Shin | G06Q 30/06 |
| | | | 705/5 |
| 2014/0337068 A1 | 11/2014 | Nelson et al. | |
| 2016/0371798 A1* | 12/2016 | Ghahramani | G06Q 10/025 |
| 2018/0012161 A1* | 1/2018 | Shust | G06Q 10/06311 |

OTHER PUBLICATIONS

Trip Advisor https://www.tripadvisor.com/ShowTopic-g60763-15-k765660-Priceline_forbooking_hotels_cancelable-New_York_City_New_York.html (Year: 2006).

Splitty. Home Page. Retrieved from [htlps://www.splittytravel.com/] on Apr. 6, 2017.

Splitty. "Frequently Asked Questions." Retrieved from [hllps://www.splittytravel.com/frequenlly-asked-questions] on Apr. 6, 2017.

\* cited by examiner

MIXTURE QUERIES FOR SEARCH ENGINE PORTALS

TECHNICAL FIELD

The disclosures herein are generally directed to database and file access including the retrieval of information stored in a database. Aspects of the disclosures herein are also generally directed to database query processing including executing a request for data by a computerized data processing system as well as distributed search and retrieval including processes that locate and retrieve data from multiple databases located over different locations around a network.

The disclosures herein are more particularly directed to search engines and search engine portals for searching multiple search engines or online databases. The disclosures herein are also more particularly directed to query statement modification including adapting a query statement from its original form in order to assist in retrieval and execution of search results as well as query expansion including adapting an original query to provide more precision. Aspects of the disclosures herein are further directed to post processing of search results to facilitate more efficient comprehension and presentation of the search results.

BACKGROUND

Online lodging search services ("lodging search services") often utilize pricing engines (e.g., ITA, Expedia BFS, Amadeus, etc.), Global Distribution Systems (GDSs), Online Travel Agencies (OTAs), and direct lodging websites (collectively "lodging service providers" or "providers") to obtain hotel options in response to user queries. Many lodging service providers also provide booking services for destination locations. Lodging service providers also may provide lodging availability, prices and booking information independent of or in combination with providing flight information or flight search services. For example, OTAs may be queried or lodging information sources may be directly scraped for pricing/availability and the results may be presented to the user requesting the lodging information. Some travel service providers such as Expedia and Orbitz will negotiate prices for blocks of rooms for a set of predetermined dates from respective lodgings (e.g., hotels) and resell the rooms to users inquiring about lodging pricing/availability using their services. Lodging information may be obtained in other ways to allow for lodging booking online, with or without booking of an associated flight.

Lodging pricing and availability information is typically derived by lodging search services in three different ways: (1) obtaining the information directly from the respective lodging website (referred to herein as "scraping"); (2) querying a lodging service provider that serves up aggregated lodging pricing and availability; and/or (3) referencing a cache compiled by the lodging service provider. Querying provides the most robust, accurate and up-to date information on lodging availability and pricing. However, querying is not necessarily preferable for every user query for a number of reasons. First, lodging service providers may restrict the frequency of queries and/or limit the volume of queries during a given interval of time. Second, providers often prefer a higher ratio of bookings to queries than may be possible when using queries for every user search. Third, querying increases the time before the user sees search results. At least in some circumstances, this drop in response time may be unacceptable to the user such that the user will choose to either not use the travel service, or switch to a speedier alternative.

To address drawbacks associated with querying OTAs, a lodging search service may build and maintain a lodging cache that stores information previously obtained from either scraping or querying providers. The lodging cache may be updated by periodically scraping and/or querying providers according to the frequency/volume restrictions that are imposed, thus keeping the lodging cache as up-to-date as is feasible in this respect. Updating the lodging cache may be performed off-line (e.g., cache updates do not need to be performed live in conjunction with user queries) such that the user experience in this respect is not impacted. Because the lodging information stored in the cache is not "live," there is a risk that lodging information may become stale if not updated with sufficient regularity, or the cache may otherwise include old or incorrect information. A variety of measures may be taken to optimize the lodging cache to ensure that the lodging information stored is as accurate and up-to-date as is feasible without compromising the efficiencies for which the cache was developed in the first place. Due to the risks associated with stale data, however, lodging caching might not be a satisfactory approach in circumstances where information needs to be accurate with a high-degree of certainty.

Conventional lodging search services, in response to a user query (or in connection with a user's flight inquiry) report the best available prices for lodgings for the whole stay of the user. For example, if a traveler is staying in Chicago, Illinois from May $13^{th}$ (5/13) through May $17^{th}$ (5/17), lodging search services conventionally return the best price for respective lodgings over the full span of the stay. However, the price returned from a query over the whole stay may not be the least expensive option. A better price might be achieved by searching over smaller time periods within the target stay dates. For example, the cheapest rate returned for the 5/13-5/17 Chicago trip at a particular hotel might be $700/night, but Booking.com offers $500/night for 5/13-5/15 and Orbitz.com offers $400/night for 5/15-5/17, for a total average price of $450/night. Conventional queries cannot identify this booking and the user loses out on the cost savings of the cheaper booking.

To address this drawback associated with conventional queries, techniques have been employed that split the query into two or more queries spanning different subsets of the stay, referred to herein as a "mixture query," may result in lower rates for the user. For example, if the above Chicago trip were split into two queries, a first query for the dates of 5/13-5/15 and a second query for the dates of 5/15-5/17, a split booking from Booking.com and Orbitz would result in substantial savings for the user. Such price reductions for certain dates may result from a number of circumstances. Providers may raise or lower the price of rooms independently of other providers, depending on their particular pricing strategy and the demand for that lodging and date combination that they observe. In addition, lodgings may offer deals for selected (and usually limited) nights and such deals or promotions tend to be variable in nature and often may be relatively short in duration (e.g., a couple of nights). In some circumstances, the cheapest combination involves different room types from the same or different providers. In some instances, the mixture query may expose errors resulting in unnaturally high prices for the entire stay or other factors that allow the mixture query to identify cheaper rates than could be obtained using conventional single queries. Lastly, certain low-cost providers may show availability on only some of the dates of the stay. Accordingly, conventional single query approaches miss these circumstances and frequently return suboptimal information from a pricing and/or availability perspective.

Existing techniques for performing mixture queries have recognized that it cannot be known a priori what the optimal split for a particular stay will be, or if a split booking even exists that would result in a lower price point for the user. One method of addressing this issue is to provide an exhaustive search of all combination of splits (i.e., perform all sub-searches corresponding to the target stay). However, doing so may result in a detectable delay for the user in reporting results, as well as an increased number of queries to providers. In addition, some combinations may not be suitable or desirable from a user perspective. While the exhaustive approach is a feasible and, in some cases, may be the most attractive approach to mixture querying, other ways to reduce the number of queries in a mixture query approach are possible.

According to some approaches, stay combinations including single nights are eliminated prior to searching. For example, if a user searches for rates in San Francisco, CA from 6/17-6/21, a mixture query may be performed that eliminates combinations of 1 night/4 night splits. Accordingly, in an example where a mixture query for the above stay is limited to splits that contain only two sub-searches, the three possible combinations for this stay after removing 1 night/4 night splits are shown in the Table 1 below.

TABLE 1

|         | Sub-Query 1 | Sub-Query 2 |
|---------|-------------|-------------|
| Split 1 | 6/17-6/18   | 6/18-6/21   |
| Split 2 | 6/17-6/19   | 6/19-6/21   |
| Split 3 | 6/17-6/20   | 6/20-6/21   |

Any of the combinations may result in a cheaper split stay than a single query for the whole stay of 6/17-6/21. Such a split stay result may be presented to the user to allow the user the option of taking advantage of the cost savings associated with the split stay. It should be appreciated that the mixture query need not be limited to splitting the stay into two subsets as shown in the exemplary mixture query in Table 1, as any number of sub-queries may be performed over any number of subsets of the stay, as the aspects of the disclosures are not limited in this respect.

Other methods of eliminating at least some of the queries from a mixture query derive from the recognition that the dates of a proposed stay may be intelligently examined to determine optimal split points. For example, lodgings often have rate differences between the weekend and the weekday. Accordingly, if a stay includes a Friday or a Monday, such dates may be flagged as split-points to include in a sub-search for mixture queries where the number of searches is to be reduced from that of an exhaustive search. Similarly, availability in general and/or availability for particular rooms may vary on weekend/weekday borders and these may represent optimal split-points for mixture queries. Other methods of selecting a subset of searches from an exhaustive list of searches may be performed, as the aspects of the disclosure are not limited in this respect.

Another method for identifying a potential best split for a given hotel is to examine per night rates, obtained in some cases when querying providers for longer stays. While these do not always dictate the pricing of longer stays, they may be used in some cases to predict split pricing. For example, if the cache indicates that provider A charges $199, $199, $150 and $150 for a four-night stay and provider B charges $175, $175, $175 and $175, a mixture query that includes only the sub-queries that yield $175, $175, $150 and $150 may be performed.

While existing techniques for performing mixture queries and booking split stays provide some advantages over conventional online lodging queries, there is still room for improvement.

For example, some existing techniques require the user to book each leg of the split stay. This often involves leaving the lodging search engine's website in order to individually book the legs of the split stay using the OTAs' or the lodgings' own websites. Requiring users to book each leg of the split stay themselves is potentially inefficient from an HCI (human-computer interface) perspective and potentially risky with respect to successfully completing the booking process. Leaving the lodging search provider's website might require a user to open multiple tabs in a web browser and navigate between those tabs in order to complete the booking process. For web browsers that are not tab-enabled, completing the booking process might involve navigating between the websites using the web browser's "Back" button. While these user interface controls might be acceptable to computer-savvy users, inexperienced computer users might have difficulty completing the booking process in a timely fashion (if at all) where those users are required to jump between websites and/or tabs in order to book each leg of the split stay. Accordingly, existing techniques for performing mixture queries and booking split stays risks alienating potential users through an interface that is not efficient and not user-friendly. Regardless of the users' experience, however, requiring users to book each leg of the split stay themselves introduces at least some delay in the booking process. Hotel pricing and availability is highly dynamic sometimes changing multiple times throughout the day. Accordingly, requiring users to book each leg of the split stay themselves thus also risks one or more legs of the split stay becoming unavailable (e.g., due to shifting availability and/or pricing) between the time split stay option is presented to the user and the time the user can successfully complete the booking for each leg of the split stay.

The HCI challenges mentioned above are exacerbated on mobile devices. The use of mobile computing devices such as tablet computers and smartphones has proliferated with many users relying on mobile computing devices as their primary computing device in favor of traditional desktop or laptop computing devices. Mobile computing devices typically have much more limited screen space as compared to traditional desktop and laptop capabilities. In addition, the means with which users provide input often differs between mobile computing devices (e.g., touch interfaces, soft keyboards, gestures) and traditional desktop and laptop computing devices (e.g., hard keyboards, touchpads, pointing devices). In view of the different design constraints associated with mobile computing devices, technical challenges have arisen with respect to how information is presented to a user and how input is received from a user. In the context of lodging search services, such technical challenges include providing efficient and user-friendly means for receiving lodging search criteria from the user, presenting lodging search results to the user, and enabling the user to complete a booking for a selected lodging search result. In a mobile computing device with limited screen space, for example, the number of search options and the number of search results that can be presented to the user at any given time might be limited as compared to a computing device having more screen space (e.g., a desktop with an external monitor). A mobile computing device such as a smartphone might also be limited with respect to the number of web pages that can be open at any given time. Even if the mobile computing device permits multiple web pages to be opened simultaneously, multiple user commands are often required to switch between those web pages. Accordingly, requiring the user to individually book each leg of a split stay is results in similar inefficiencies when performed with a mobile computing device that delay successful completion of a split booking which likewise risks one or more legs of the split booking becoming unavailable.

Additional technical challenges arise when the user attempts to book a split stay with a mobile computing device. Response time may depend on the quality of the wireless signals exchanged between the mobile computing device and the networks used to connect to the lodging service providers. Accordingly, when the user is required to exchange multiple communications with one or more lodging service providers in order to successfully book each leg of the split booking, poor wireless signal quality may also prolong response time during the booking process thus again risking one or more legs of the split stay becoming unavailable.

As another example, some existing techniques utilize a cache of historic search data when performing a mixture query search. Here, the cache of historic search data characterizes prior searches conducted by other users including pricing and availability associated with those prior searches. Existing techniques leverage this cache of historic search data by searching the cache for any prior searches that match the sub-queries of a mixture query. If found, the search results of matching prior searches are used to identify potential split stays for the current user. Consider a current user's search query for a stay in Chicago between 3/13-3/20. A mixture query might split the user's search query into two sub-queries for 3/13-3/17 and 3/17-3/20. Existing techniques might leverage the cache of historic search data to identify prior searches for stays in Chicago between 3/13-3/17 and prior searches for stays in Chicago between 3/17-3/20. Based on the pricing data associated with the respective search results of these prior searches, potentially cheaper split stays might be identified. However, current pricing data can differ from pricing data associated with prior searches. In other words, historic pricing data can, and often does, become stale and thus inaccurate with respect to a current search. If current pricing data has changed since the prior searches, then relying on historic pricing data might incorrectly identify a potential split stay as a relatively cheaper option. To address this challenge of relying on historic search data, some existing techniques confirm the pricing data associated with the potential split stay with the OTAs, or the hotels themselves, before presenting the split stay to the user. This confirmation, however, only introduces new challenges to performing mixture queries and booking split stays. Confirming the pricing data used to identify a potential split stay involves additional commands and communications in order to assess whether that pricing data is accurate. Thus results in a relatively less efficient process of identifying potential split stays to present to a user. In addition, this confirmation only prolongs the response time for performing mixture queries thus degrading the experience for the user.

As a further example, some existing techniques are limited in that they only identify potential split stays on the basis of price and in that they do not enable split stays at different hotels. In addition, existing techniques might not take into account differences in room amenities where the user is required to switch rooms between legs of the split stay. Switching rooms without taking into consideration differences in room amenities might not be acceptable in some situations, e.g., when the user requires multiple beds during each leg of the stay but the second room includes only a single bed. Furthermore, existing techniques might not enable a user to specify additional or alternative criteria with which to pair potential legs of a split stay. Existing exploration tools might therefore be limited in their ability to function as an effective means with which to identify potential split stays during a travel-related search.

In view of these challenges and limitations associated with existing techniques for performing mixture queries and processing split bookings, improvements are needed.

SUMMARY

The following presents a simplified summary in order to provide a basic understanding of the disclosures herein. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

The present disclosure describes approaches for improving mixture queries and booking split stays. According to some aspects, a user utilizes an exploration tool to search for available lodging. A mixture query is generated based on the stay information received from the user and potential split stays are identified and presented to the user. In some aspects, the split stays are identified based on user-specified split stay criteria, search results are obtained from a local database of "live" pricing and availability information, and a selected split stay option is booked on behalf of the user. Example split stay criteria includes criteria pertaining to an amenity or characteristic of the available lodgings or the available rooms. Booking a split stay on behalf of the user may include booking each leg of the split stay on behalf of the user. In some additional aspects, a booked split stay may be monitored to identify booking options determined to be relatively better booking options. One or more legs of the booked split stay may then be modified or canceled to rebook the user at the better booking option.

Additional aspects associated with improved techniques for performing mixture queries and booking split stays will be appreciated with the benefit of the disclosures set forth in further detail below.

BRIEF DESCRIPTION OF THE DRAWINGS

Some features herein are illustrated by way of example, and not by way of limitation, in the accompanying drawings. In the drawings, like numerals reference similar elements between the drawings.

DETAILED DESCRIPTION

Figure 1:
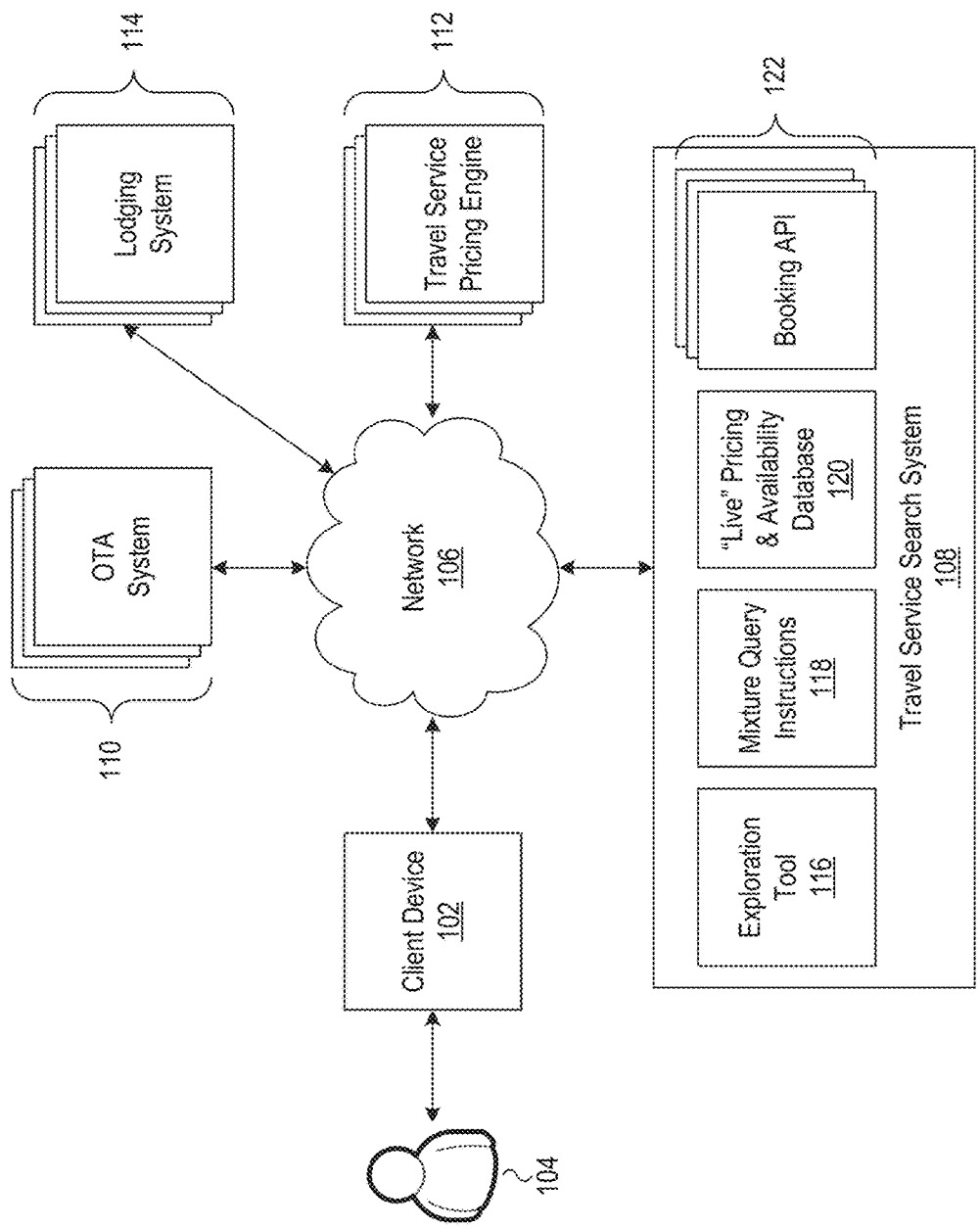
FIG. 1 depicts components of an example travel service computer system.

To address the technical challenges and limitations discussed above, the disclosures herein describe improvements to performing mixture queries and booking split stays. As discussed in further detail below, such improvements include booking a split stay on behalf of the user, utilizing a database of "live" pricing and availability information, evaluating hotel and/or room amenities when pairing search results for potential split stays, and employing user-selected split stay criteria when identifying potential split stays. Each of these improvements addresses one or more of the technical challenges and limitations discussed above. Additional details are described below with respect to the improved techniques for performing mixture queries and booking split stays.

With respect to booking a split stay on behalf of the user, this ensures the user can complete the booking process without needing to navigate to the individual websites or portals of the lodging service providers. In other words, the user can complete the booking process at the same user interface used to search for stay information (e.g., from the same website or within the same application). This aspect of the improved techniques for performing mixture queries and booking split stays provides numerous technical advantages and technical efficiencies.

First, by booking a selected split stay on behalf of the user, the volume of user input, user commands, and network communications is thereby reduced. Consider, for example, a split stay having two legs in which each leg is associated with a different lodging service provider. Rather than input booking information (e.g., name, payment information, etc.) twice for each lodging service provider, the user may enter the booking information once, and that booking information is then used to book each leg of the split stay on behalf of the user. Furthermore, as discussed in further detail below, the lodging search service utilizes booking APIs (application programming interfaces) in order to book the split stay on behalf of the user. By using booking APIs, the lodging service providers can avoid the need to serve webpages to the users corresponding to the booking paths typically utilized by the user to book split stays themselves. By avoiding the need to serve booking path webpages to users, the network bandwidth needed to complete a split booking is thereby reduced. In this regard, a more efficient means of completing split bookings is attained.

Second, by booking a selected split stay on behalf of the user, the usability of the lodging search service as a tool for performing mixture queries and booking split stays is improved from an HCI perspective. Retaining the user at a user interface used to perform both the search and the booking reduces the number of user interfaces the user must interact with in order to book a split stay. Rather than require a user to navigate multiple user interfaces to book each leg of a split stay, the user can book both legs of the split stay from a single user interface. The user interfaces used to book stays often differ from provider to provider, with each interface implementing its own unique booking path to book a stay. Furthermore, there is no guarantee that the user interfaces implemented by the lodging service providers are intuitive and user-friendly. Unsophisticated users might find it difficult to quickly and easily navigate multiple user interfaces that each implement unique interface controls and uniquely functionality for booking a stay. Even sophisticated users might be slowed down by an unfamiliar user interface and an unfamiliar booking path. As noted above, delays in booking each leg of the split stay risks one or more of those legs becoming unavailable before booking all legs of the split stay. Accordingly, by booking a split stay on behalf of the user, the number of different user interfaces the user is required to interact with is thus reduced. As shown by way of example in FIGS. 3-5, in some implementations, the number of user interfaces the user interacts with in order to book a split stay is reduced to a single user interface, e.g., the user interface provided by the website of the lodging search service provider. As a result, a more efficient means of completing split bookings is again attained. Improvements to the usability of the lodging search service are similarly obtained on mobile computing devices. Rather than require a user to navigate back and forth between multiple tabs, web pages, etc., in order to book multiple legs of a split stay, booking a selected split stay on behalf of the user as described herein reduces the amount of user input and the amount of time necessary to successfully book a split stay.

Third, booking a selected split stay on behalf of the user, enables the booking to be completed relatively more quickly thereby reducing the possibility that one or more legs of the split stay might become unavailable before each booking can be completed. As noted above, where users are required to book each leg of a split stay themselves, delays can arise due to the users' unfamiliarity with the user interfaces and booking paths, user interfaces that are not user-friendly, a network delays between the users' client devices and the systems of the lodging service providers. As a result, booking each leg of the split stay on behalf of a user increases the likelihood that booking each leg of the split stay will be successfully completed thereby improving again the effectiveness of the lodging search service as a tool for performing mixture queries and booking split stays.

With respect to utilizing a database of "live" pricing and availability information, this provides a more efficient means of identifying potential split bookings that might be presented to a user. As noted above, some existing techniques for performing mixture queries utilize historic search data for which pricing information might have become stale and thus no longer accurate. Accordingly, some existing techniques perform an additional step to confirm that the pricing information associated with a previously search is current and still accurate. As described in further detail below, however, the improved techniques for performing a mixture query described herein do not utilize historic search data but rather a database of "live" pricing and availability information. This database of "live" pricing and availability information is associated with a relatively high degree of certainty (e.g., 96-97%) that the pricing and availability information it contains is current and thus accurate. Accordingly, the step of confirming pricing information with lodging service providers can be eliminated in some example implementations of the improved techniques for performing mixture queries described herein. By eliminating this confirmation step, a more efficient means of performing mixture queries is attained by reducing the number of steps carried out (and corresponding computer instructions executed and network communications exchanged) to identify potential split stays to present to a user. In addition, by eliminating the confirmation step, the improved techniques for performing mixture queries described herein are not subject to network delays that might occur when confirming the pricing information with the lodging service providers.

With respect to evaluating hotel and/or room amenities when identifying potential split stays, this again improves the effectiveness of the lodging search service as a tool for performing mixture queries and booking split stays. Some existing techniques for identifying potential split stays might not take into account difference in room amenities when presenting split stays to the user relying solely on whether or not the split stays provide a relatively cheaper price. In order to obtain the advantages of a cheaper price by opting for a split stay, however, the user might be required to sacrifice a level of convenience by switching rooms during the stay. While switching rooms might be acceptable to some users, other users might be unwilling or unable to do so if the room amenities are significantly different. For example, a solo business traveler might not object if required to switch from a room with two queen beds to a room with a single king bed during a split stay (or vice versa). In contrast, a family traveling together might be unwilling to switch from a room with two queen beds (needed to accommodate all members of the family) to a room with only a king bed. The improved techniques for performing mixture queries described herein take into account additional criteria beyond simply pricing (e.g., room amenities) when identifying split stays to present to a user. As described in further detail below, in some example implementations, the process of pairing potential legs of a split stay evaluate the room amenities to ensure one or more room amenities (e.g., bed type) are consistent for each leg of the split stay. In this regard, the functionality of the lodging search service as a tool for performing mixture queries is thereby enhanced.

With respect to employing user-selected split stay criteria when identifying potential split stays, this also enhances the functionality of the lodging search service as a tool for performing mixture queries. As described in further detail below, the improved techniques described herein provide users with greater control over the potential split stays identified during a mixture query. This is achieved through split stay criteria obtained from the user during the search process. The split stay criteria may identify, for example, amenities that must be consistent between each leg of the split stay, amenities that may differ, and/or amenities that must differ. For example, a user might provide, via user input, split stay criteria indicating that the bed type (e.g., two twin beds) must be the same for each leg of a split stay. Alternatively, the user might provide split stay criteria indicating that the bed type may differ between legs of the split stay. Further still, some users might want to vary their experiences during their stay and provide split stay criteria indicating amenities that must be different between the legs of the split stay. For example, a user traveling to Las Vegas might desire to stay in a hotel offering both a city view (e.g., of the Las Vegas Strip) as well as a desert/mountain view and thus provide split stay criteria indicating that the room's view must be different for each leg of the split stay. Furthermore, some existing techniques for performing mixture queries are limited to split stays in the same hotel. The improved techniques for performing mixture queries described herein, however, identify potential split stays across different lodgings (e.g., different hotels). Split stay criteria and the evaluation of amenities is thus extended to multi-lodging split stays in the improved techniques for performing mixture queries described herein. Some users might find it inconvenient to switch lodgings in the middle of a stay while other users might find it desirable (e.g., in order to vary their travel experience). Accordingly, the split stay criteria received from a user may indicate whether changing lodgings during a split stay is prohibited, permissible, or required. For example, a user might find it desirable to switch lodgings during a split stay in order to experience a different district or neighborhood of their travel destination (e.g., a historic district and a nightlife district). In addition to room amenities, the split stay criteria received form a user may also indicate whether changes to any lodging amenities are prohibited, permissible, or required. For example, a user might provide split stay criteria indicating a multi-lodging split stay is permissible, but that all lodgings for the split stay are required to have an exercise room. In this regard, the split stay criteria provides the user with a great deal of control over the identification of potential split stays that takes into account much more than a potentially cheaper price, e.g., room and lodging amenities that are important to individual users. As a result, the lodging search service as a tool for performing mixture queries more effectively meets a user's travel needs and/or preferences.

For the sake of convenience, the following terminology is adopted herein. Search queries include searches for stay information based on search criteria received from a user. Stay information includes information relating to available lodging such as, for example, dates the lodging is available, the location of the lodging, pricing (e.g., price per night), and amenities. Lodgings include, for example, hotels, motels, hostels, houses, condos, apartments, mobile homes, campsites, caravan parks, and the like. A stay is identified at least by a location (e.g., Chicago), a start date (or check-in date, e.g., 3/13), and an end date (or check-out date, e.g., 3/20). A stay might also be identified by a particular lodging (e.g., the "Drake Hotel"). The search criteria received from the user can include one or more items of stay information, e.g., a desired location and desired check-in/check-out dates. A booking corresponds to a stay and includes a reservation at a lodging for the stay in which the reservation has simply been requested or both requested and confirmed. Accordingly, booking a stay includes making reservations at a lodging for a selected stay option. For example, a user seeking lodging in Chicago for March 13-20 might be described as "seeking a stay in Chicago for 3/13-3/20." The search criteria for a corresponding search might thus include "Chicago" as the location, "3/13" as the check-in date, and "3/20" as the check-out date. The search results for this example search query might include one stay option for the "Drake Hotel" at $150 per night and another stay option at the "W Hotel" for $175 per night. If the user in this example selects to stay at the Drake Hotel, then the user might also be described as having "selected a stay option at the Drake Hotel for $150 per night." The user may then complete the booking process for the selected stay option in which the user might further be described as "having completed the booking for the stay at the Drake Hotel for 3/13-3/20." As noted above, a mixture query includes at least two sub-queries corresponding to a search query. An example mixture query for the example above might include a first sub-query seeking stay information for Chicago on 3/13-3/17 and a second sub-query seeking stay information for Chicago on 3/17-3/20. As seen in this example, the end date of the first sub-query is the start date of the second sub-query (e.g., 3/17). In a similar fashion, a split stay includes at least two "legs," each leg being identified by at least a start date and end date (or check-in/check-out dates). Each leg of a split stay can be associated with the same lodging (e.g., the "Drake Hotel" for both legs), or individual legs of a split stay can be associated with different lodgings (e.g., the "Drake Hotel" for the first leg and the "W" Hotel for the second leg). In this regard, a split booking includes corresponds to a split stay and includes respective reservations at one or more lodgings for the split stay (e.g., multiple reservations at the "Drake Hotel" for each leg of a split say, or a first reservation at the "Drake Hotel" for a first leg of the split stay and a second reservation at the "W Hotel" for a second leg of the split stay).

Turning now to FIG. 1, components of an example travel service computer system 100 is shown. The travel service computer system 100 is a networked system by which a user may obtain, among other travel-related information, lodging search results that meet a user's specified lodging search criteria. Relevant to the present disclosure, lodging search criteria includes stay criteria to book lodging reservations such as, for example, location (e.g., city, state), type (e.g., hotel, motel), dates (e.g., check-in, check-out), amenities (e.g., one bed, two beds), and other types of stay criteria that will be appreciated with the benefit of this disclosure. Although the travel service computer system 100 shown by way of example in FIG. 1 is described in the context of lodging, it should be appreciated that, in some example implementations, the system may provide other travel-related services such as flight search services and flight booking services and/or vehicle rental search services and vehicle rental booking services. Accordingly, the lodging search criteria can be understood as one type of travel-related search criteria which also includes flight search criteria used to search for flights, and vehicle rental criteria to rent vehicles. Similarly, the lodging search results can be understood as one type of travel-related search results which also includes flight search results and vehicle rental search results.

The travel service computer system 100 includes a client device 102 associated with a user 104. The user's client device 102 may be any network-enabled device configured to access and exchange communications via a network 106. Example client devices include workstations, desktop computers, laptop computers, tablet computers, computer terminal, kiosk, microconsole, mobile telephones (e.g., "smartphones," "feature phones"), portable media player, personal digital assistant (PDA), video game console, set-top box, "smart" television, "smart" watch, "smart" speaker, e-book reader, in-vehicle navigation device, in-vehicle entertainment device, and the like. The network 106 may include one or more wired or wireless networks such as, for example, private networks, public networks, the Internet, cellular networks, local area networks (LANs), wide area networks (WANs), and the like.

The travel service computer system 100 also includes a travel service search system 108 configured to perform lodging search queries on behalf of the user 104. The travel service search system 108 is implemented and operated by a travel search service provider such as Kayak.com. Relevant to this disclosure, lodging search queries include search queries for stay information. For example, the user 104 may specify stay criteria regarding a potential stay using the client device 102, and the lodging search service provider may provide available stay information that match the specified stay information using the lodging search service system 108. As noted above, lodging search queries may be performed independent of or in combination with flight search queries and/or vehicle rental search queries. Accordingly, in some example implementations, the travel search service system 108 may also be configured to perform flight search queries and vehicle rental search queries on behalf of the user 104. To receive the stay criteria from the user 104 and to provide stay information to the user, the client device 102 and the travel service search system 108 exchange various communications via the network 106. The travel service search system 108 may include one or more computing devices such as servers, data storage devices, and the like.

To perform a lodging search query on behalf of the user 104, the travel service search system 108 also exchanges communications with various information sources via the network 106. The travel service computer system 100 includes different types of information sources including OTA (Online Travel Agencies) systems 110, travel service pricing engine systems 112, and individual lodging systems 114. An OTA (examples of which include Orbitz and Travelocity) may provide its own search engine for performing travel-related search queries including lodging search queries. Accordingly, the travel service search system 108 may submit one or more lodging search queries to one or more of the OTA systems 110 when performing a lodging search query on behalf of the user 104. The travel service search system 108 may likewise submit one or more lodging search queries to one or more of the travel service pricing engine systems 112 and/or one or more of the lodging systems 114 (e.g., an individual hotel website) when performing a lodging search query on behalf of the user 104. The travel service search system 108 may compile the search results received, process the search results (e.g., by filtering, grouping, arranging, ranking, etc.), and provide one or more of the search results to the client device 102 for presentation to the user 104. It should be appreciated that the number and type of information sources are illustrated in FIG. 1 is by way of example only and that any number of information resources may be connected to the network 106 and made accessible to the travel service search system 108. It should thus also be appreciated that the travel service search system 108 may interact with any combination of information sources when performing a lodging search query on behalf of the user 104, including a single information resource or multiple information resources. In this regard, the travel service search system 108 may be described as operating as a metasearch engine (or aggregator) when it queries multiple information sources (e.g., multiple OTAs each providing its own search engine) when performing a lodging search query on behalf of the user 104. In addition, in some example implementations, the travel service search system 108 may not interact with any of the information resources when performing a lodging search query. Instead, as discussed in further detail below, a database of "live" pricing and availability information residing locally at the travel service search system 108 may be utilized when performing a lodging search query.

The travel search service system 108, in this example, is configured to receive stay criteria from the user 104, perform mixture queries according to the stay criteria received, and book a selected split stay option on behalf of the user. In this regard, the travel search service system 108, in this example, includes an exploration tool 116, a set of executable mixture query instructions 118 stored in memory, a "live" pricing and availability database 120, and one or more booking APIs 122. It will be appreciated that the travel search service system 108 may include other components employed to carry out various aspects associated with performing mixture queries and booking split stays which have been omitted from FIG. 1 for the sake of clarity. For example, example implementations of the travel search service system 108 may include one or more of a web server that serves, to the client device 102, webpages providing access to the exploration tool 116, an application server that executes the mixture query instructions, and/or a mobile server that exchanges communications with a mobile application residing at the client device and providing access to the exploration tool. In addition, as described in further detail below, the travel search service system 108 may include one or more computer processors that respectively execute one or more of the mixture query instructions 118.

The exploration tool 116 provides the functionality that enables a user to search for, view, and select available lodging options. As discussed above, the exploration tool 116 may also provide functionality to search for, view, and select other travel-related services such as flight options and vehicle rental options. In some example implementations, the exploration tool 116 is a networked-based tool (e.g., a website or hosted application) that is accessible to the user 104 via a webpage, desktop application, or mobile application presented at the client device 102. The exploration tool 116 receives stay criteria provided by the user 104 via the client device 102. The exploration tool 116 then performs a mixture query according to the stay criteria received and receives search results corresponding to stay options that satisfy at least a portion of the stay criteria, e.g., stay options with availability dates on or between the check-in/check-out dates specified by the user. The exploration tool 116 then processes the search results to identify potential split stay options that satisfy the criteria specified by the user and provides one or more of the split stay options identified to the client device 102 for presentation to the user 104. The operation of the exploration tool 116 is at least partially governed by the mixture query instructions 118. The exploration tool 116 may also receive user input indicating a selection of one of the split stay options and, in response, provide additional details pertaining to the split stay option selected. The exploration tool 116 also receives user input corresponding to a command to book a selected split stay option and carries out the booking process on behalf of the user 104 in order to book each leg of the selected split stay. The exploration tool 116 may utilize one or more of the booking APIs 122 to book the legs of the split stay.

The stay criteria received from the user may be any type of parameter, requirement, preference, or characteristic related to lodgings that might be acceptable to the user. For example, stay criteria may include without limitation one or more of: a location (e.g., city, state, region, district, zip code, neighborhood); check-in/check-out dates; a price range (e.g., maximum and/or minimum prices); star ratings (e.g., three star, four star, etc.); lodging types (e.g., hotel, motel, bed-and-breakfast); lodging amenities (e.g., pool, exercise room, free breakfast); room types (e.g., single, suite); room amenities (e.g., bed type, hot tub, view); activities (e.g., golf, gambling, skiing); proximity to attractions (e.g., beaches, parks, mountains); and other lodging-related criteria.

The stay criteria received from the user may also include split stay criteria. The split stay criteria may likewise be any type of parameter, requirement, preference, or characteristic related to a split stay option that might be acceptable to a user. As noted above, split stay criteria may include without limitation one or more of: an indication whether switching rooms and/or lodgings is prohibited, permissible, or required for a split stay; a location for a subsequent leg of the split stay, e.g., within or beyond a threshold distance of the location of a previous leg of the split stay; whether a similar room is required or a dissimilar room is permitted for a subsequent leg of the split stay; particular lodging amenities that are required for one or more legs of the split stay; and particular room amenities that are required for one or more legs of the split stay.

To perform mixture queries and book split stays, the travel search service system 108, in this example, selectively executes mixture query instructions 118. Simply for the sake of convenience in explaining the principles of this disclosure, the mixture query instructions 118 may be logically grouped according to the functionality they provide when executed by the travel search service system 108. For example, the mixture query instructions 118 may be described as including a set of instructions for splitting a user-submitted search query into multiple sub-queries, a set of instructions for executing the sub-queries, a set of instructions for pairing stay options for each leg of a potential split stay based on the search results for the sub-queries, a set of instructions for providing search results that include split stay options, and a set of instructions for booking a selected split stay on behalf of the user. One or more computing devices of the travel search service system 108 may be programmed with some or all of the mixture query instructions 118. For example, a single computing device (e.g., an application server) of the travel search service system 108 may be programmed with all of the mixture query instructions 118 and thus be configured to perform all of the functionality associated with performing mixture queries and booking split stays. Additionally and/or alternatively, the travel search service system 108 may include multiple computing device in signal communication with each other that are each respectively programmed with some portion of the mixture query instructions 118 and operate together in order to perform mixture queries and book split stays. For example, one computing device (e.g., a web server) may be programmed with one portion of the mixture query instructions 118 that generates the web pages used to collect the user-specified search criteria and display potential stay options while another computing device (e.g., an application server) splitting the search query into multiple sub-queries, executing the sub-queries at the information sources, and identifies potential split stay options based on the respective search results for those sub-queries. The particular configuration of the travel search service system 108 and the computing devices thereat may vary across respective implementations without departing from spirit and scope of the present disclosure.

As noted above, splitting the search query into multiple sub-queries involves determining how to split the user-submitted search query. Accordingly, the set of instructions of the mixture query instructions 118 for splitting a user-submitted search query into multiple sub-queries may be configured to select the split points for the user-submitted search query. In addition, these instructions may apply some intelligence with respect to selecting those split points. For example, the mixture query instructions 118 may eliminate some potential splits of the user-submitted search query prior to searching as discussed above. In addition, the mixture query instructions 118 may select split points along weekday-weekend boundaries as also discussed above. Splitting the search query at weekday-weekend boundaries also enables the instructions for splitting the search query to take into account whether the respective hotels are designated as business hotels or leisure hotels. In some instances, weekday rates at leisure hotels might be relatively cheaper than weekend rates at leisure hotels and, conversely, weekend rates at business hotels might be relatively cheaper than weekday rates at business hotels. In this regard, potential split stays across hotels might be identified by splitting the search query at the weekday-weekend boundary and querying leisure hotels for the weekday leg of the split stay and querying business hotels for the weekend leg of the split stay in order to take advantage of the potentially cheaper rates.

With respect to executing the sub-queries, the mixture query instructions 118 may be configured to execute those sub-queries on the "live" pricing and availability database 120. Accordingly, the mixture query instructions 118 may be configured to format the search requests to the "live" pricing and availability database 120 according to the specifications of the database and based on the user-submitted search criteria in the sub-queries. The mixture query instructions 118 may execute the search queries at the "live" pricing and availability database 120 in lieu of or in conjunction with search requests at one or more of the information sources, e.g., the OTA systems 110, the travel service pricing engine systems 112, or the lodging systems 114. Accordingly, the mixture query instructions 118 may likewise be configured to format the search requests to the information sources according to the specifications of the information sources and based on the user-submitted search criteria in the sub-queries. Various information sources may provide search APIs that define the format and content of search requests that can be submitted at their respective systems. The mixture query instructions 118 may thus be configured to utilize those search APIs when executing sub-queries at those information sources. The mixture query instructions 118 may also be configured to execute a search query based on the user's original search criteria in order to determine whether any rate savings result from a split stay as compared to a full stay. The mixture query instructions 118 may likewise execute the search query based on the user's original search criteria at the "live" pricing and availability database 120 and/or one or more of the information sources.

With respect to pairing stay options based on the search results for the sub-queries, the mixture query instructions 118 may iterate through the stay options respectively indicated by the search results for each sub-query and identify a pair of stay options as a potential split stay to be presented to the user 104. Accordingly, the mixture query instructions 118 may be configured to retain some pairs of stay options (e.g., pairs of stay options that satisfy user-specified split stay criteria) in order to present those stay options to the user 104 as potential split stays and discard other pairs of stay options (e.g., pairs of stay options that do not satisfy user-specified split stay criteria). The mixture query instructions 118 may also retain or discard pairs of stay options as potential split stays based on whether the rate for the split stay is within a predetermined rate savings threshold. The rate savings threshold may be predefined in the mixture query instructions 118 or specified by the user 104 (e.g., savings of at least x % or $r of the average rate of all search results, savings of at least x % or $r of the lowest rate in the search results, x % or $r of the highest rate in the search results, x % or $r of the median rate in the search results, etc.). The mixture query instructions 118 may be configured to retain pairs of stay options as potential split stays using various techniques in example implementations. In some example implementations, the mixture query instructions 118 may retain pairs of stay options by flagging those pairs stay options as potential split stays in a list of pairs of stay options. In other example implementations, the mixture query instructions 118 may retain pairs of stay options by adding those pairs to a list of potential split stays. Regardless of the particular implementation, pairs of stay options identified as potential split stays to present to the user 104 may be retained in memory of the travel search service system 108 and presented to the user in the search results returned in response to the user's initial search query (e.g., via the exploration tool 116). For example, the mixture query instructions 118 may utilize the pairs of stay options identified as potential split stays retained in memory in order to generate one or more web pages of search results returned to the client device 102 and displayed in a web browser.

The mixture query instructions 118 may similarly apply some intelligence when pairing stay options. The intelligence applied may be hard-coded in the mixture query instructions 118. For example, in some implementations, the mixture query instructions 118 may be configured to identify a pair of stay options as a potential split stay option when the room's bed type (e.g., two double beds) is the same for each stay option. In other words, the "bed type" room amenity may be a hard-coded criterion applied by the mixture query instructions 118 in some example implementations. In these circumstances, any pair of stay options in which the "bed type" room amenity differs would not be identified as a potential split stay to present to the user 104. It should be appreciated that the mixture query instructions 118 may, in other example implementations, include additional or alternative hard-coded criteria corresponding to other room amenities and/or characteristics such as those discussed herein. The mixture query instructions 118 may include hard-coded criteria used to pair stay options when identifying potential split stays in order to increase the likelihood that the potential split stays presented to the user 104 would be acceptable to the user. In implementations where split stays may include stays at multiple hotels, the mixture query instructions 118 may similarly include hard-coded criteria corresponding to hotel amenities and/or characteristics.

In other implementations, the intelligence applied may be based on user-specified split stay criteria. As described above, a user may specify various combinations of room and/or hotel amenities and/or characteristics to employ when identifying potential split stays. The mixture query instructions 118 may thus be configured to utilize this user-specified split stay criteria when pairing stay options to identify potential split stays. As one example, the user 104 may specify split stay criteria requiring any split stay option to be at the same lodging in a similar room for each leg of the split stay. In this example, the mixture query instructions 118 may only pair stay options from the same lodging and retain a pair of stay options as a potential split stay if the rooms for each leg of the split stay are determined to be the same/similar. The mixture query instructions 118 may thus include instructions to determine the similarity (e.g., characterized by a similarity score) between two rooms and/or between two lodgings based on the amenities and/or characteristics of the rooms/lodgings (e.g., star rating, room tier, square footage, bed type, etc.). As another example, the user 104 may specify split stay criteria requiring any split stay option to be at different lodgings for each leg of the split stay (e.g., in order to experience a different area of the city). In this other example, the mixture query instructions 118 may only pair stay options for different lodgings and retain a pair of stay options as a potential split stay if the rooms are determined to be the same/similar.

As discussed above, the split stay criteria specified by the user 104 may be even more granular than simply whether similar/different rooms and/or lodgings are required for one or more legs of any split stays presented to the user. In some implementations, the user 104 may specify specific room and/or lodging amenities/characteristics for one or more legs of potential split stays. As one example, the user 104 may specify split stay criteria indicating that different lodgings are permitted for a potential split stay but that the lodgings for each leg of the split stay are required to have vehicle parking available. In this example, the mixture query instructions 118 may pair stay options for the same or different lodgings and retain a pair of stay options as a potential split stay if each lodging has parking. As another example, the user 104 may specify split stay criteria indicating that a different room is required for a potential split stay but that one room for the split stay is required to have a "scenic" view while the other room is required to have a "city" view. In this other example, the mixture query instructions 118 may pair stay options and retain a pair of stay options if the room for one leg of the split stay has a "scenic" view and the room for the other leg has a "city" view.

Additional and alternative examples of the manner in which the mixture query instructions 118 may employ hard-coded split stay criteria and user-specified split stay criteria will be recognized with the benefit of this disclosure. In addition, some example implementations may employ a combination of hard-coded and user-specified split stay criteria to pair stay options and identify potential split stays.

As noted above, the travel search service system 108 may include a "live" pricing and availability database 120 which may be used to obtain stay options in response to a search query from the user 104. The term "live" is used herein to convey the relatively high degree of accuracy of the pricing and availability information contained therein. In other words, the pricing and availability information stored in the "live" pricing and availability database 120 may be accurate to within such a small margin of error (e.g., 3-4% in some cases) that performing the user's search query at the "live" pricing and availability database 120 would be highly likely to provide the same results as if the user's search query were performed at the information sources themselves (e.g., the OTA systems 110, travel service pricing engine systems 112, or lodging systems 114). Performing the user's search query at the "live" pricing and availability database 120 may potentially improve the response time for providing search results to the user by avoiding the latency (and potential network delays) associated with querying one or more information sources via the network 106. Performing the user's search query at the "live" pricing and availability database 120 may also minimize costs incurred from querying any information sources that charge based on search volume and/or a search-to-booking ratio.

To implement the "live" pricing and availability database 120, the travel search service system 108 may employ priming techniques. In some implementations, priming queries may be used to populate the "live" pricing and availability database 120. A priming query describes a query that is not directly associated with a user query. Priming queries may be used to provide up-to-date booking information. Priming queries may be advantageous in mixture queries since accuracy may become more important when the user must complete two booking paths. As discussed above, some providers place limits on the number of queries the provider will support and process. Accordingly, in some embodiments, mixture queries may be limited to providers that allow a certain level of query frequency or volume such that priming queries provide a desired level of certainty that the rates will not be stale without having to perform a live query (i.e., a query responsive to a user search). Priming queries may be performed, for example, during off-peak hours so as to avoid disrupting users' interaction with the travel service search system 108.

As noted above, the travel search service system 108 includes various booking APIs 122 in order to book a split stay on behalf of the user 104. The travel search service system 108 may include a respective booking API for various information sources (e.g., the OTA systems 110, travel service pricing engine systems 112, and/or lodging systems 114) that the travel search service system is in signal communication with via the network 106. The booking APIs may define the format and content of booking requests that can be submitted to the systems of the information sources. Such content may include, for example, the name of the user, contact information for the user (e.g., address, phone number), stay information (e.g., check-in/check-out dates), hotel information, room information, and payment information (e.g., credit/debit card information). Since each information source may require a unique format for its booking requests, the booking API utilized may depend on the split stay selected by the user 104. In some example implementations, booking requests and booking responses may be formatted using an extensible markup language (XML) and transmitted via the network 106 in Hypertext Transfer Protocol (HTTP) requests/responses.

Figure 2:
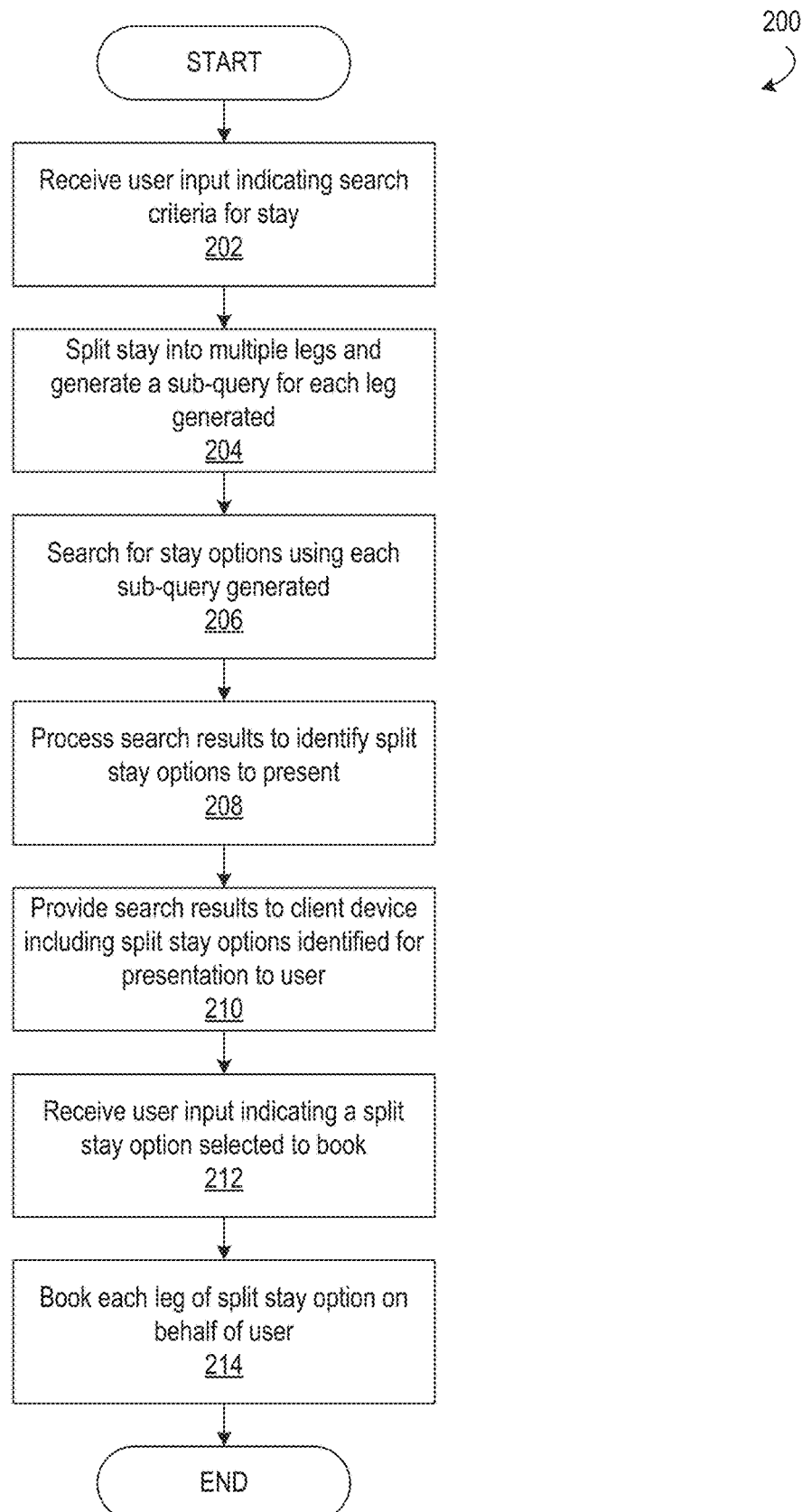
FIG. 2 depicts a flowchart of example method steps for performing a mixture query and booking a split stay.

Referring now to FIG. 2, a flowchart 200 of example method steps 202-214 for performing a mixture query and booking a split stay is shown. In this example, the process starts when the travel search service system 108 receives from the client device 102 user input indicating the search criteria for a desired stay (202). The user input, in this example, includes stay information (e.g., at least location-city/state, check-in date, and check-out date) as well as split stay criteria. The travel search service system 108 then splits the stay into multiple legs and generates a sub-query for each leg generated (204) as described above. The travel search service system 108 then searches the "live" pricing and availability database 120 using each of the sub-queries generated (206) as also described above. The travel search service system 108 processes the search results received from the "live" pricing and availability database 120 in order to identify split stay options to present to the user (208) as described above. For example, processing the search results may include pairing stay options and determining if a pair of stay options satisfies the user-specified split stay criteria. The travel search service system 108 then provides to the client device (e.g., in a webpage) the search results with the split stay options identified for presentation to the user (210). The search results provided to the client device may include both full stay options as well as the split stay options identified. The travel search service system 108 then receives user input indicating a split stay option selected by the user to book (212). The user input received may include user information, payment information, and other information used to complete a booking. The travel search service system 108 then books each leg of the selected split stay on behalf of the user (214) as described above.

Figure 3A:
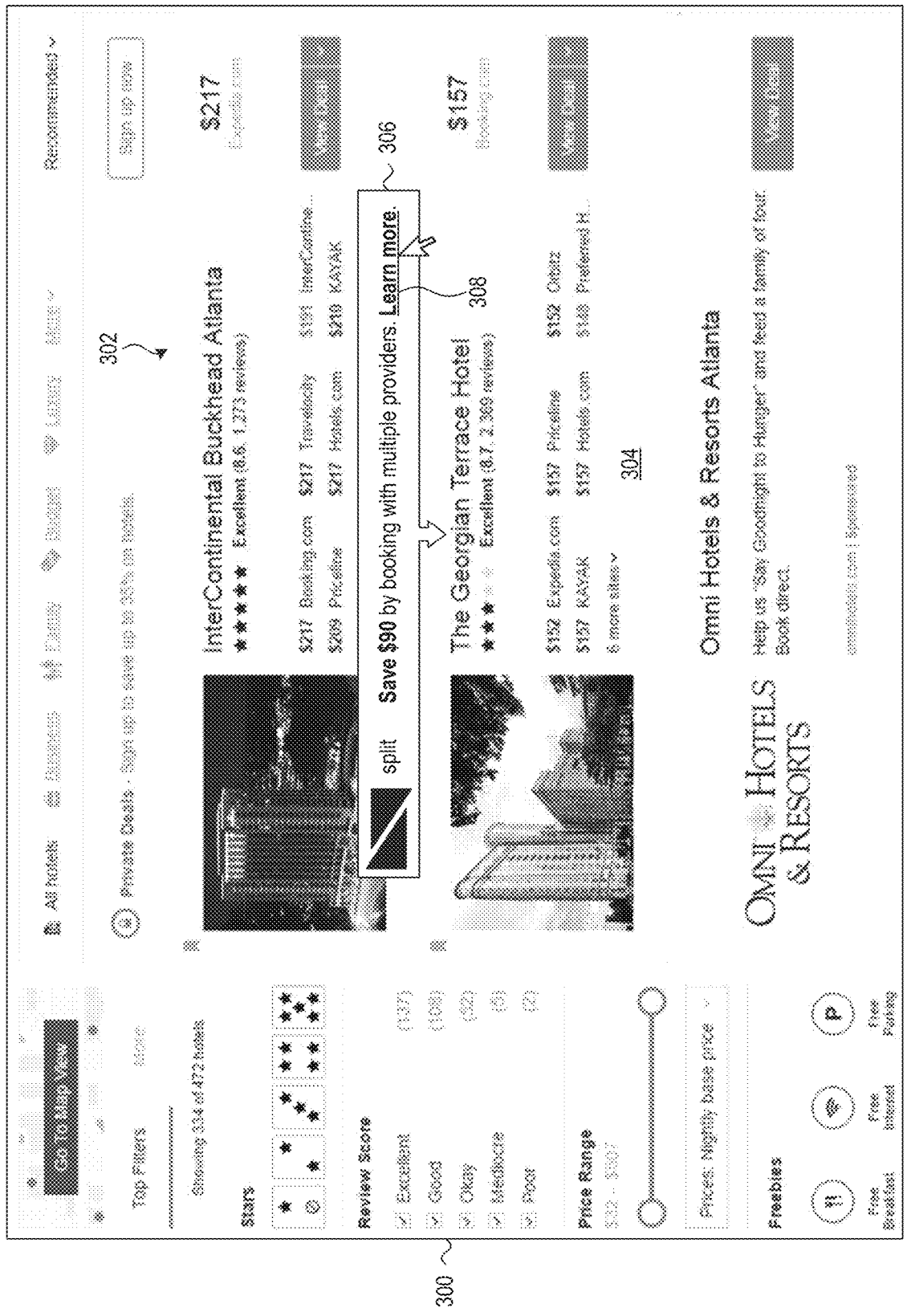
FIG. 3A depicts an example exploration tool implementing one aspect of performing a mixture query and booking a split stay.
Figure 3B:
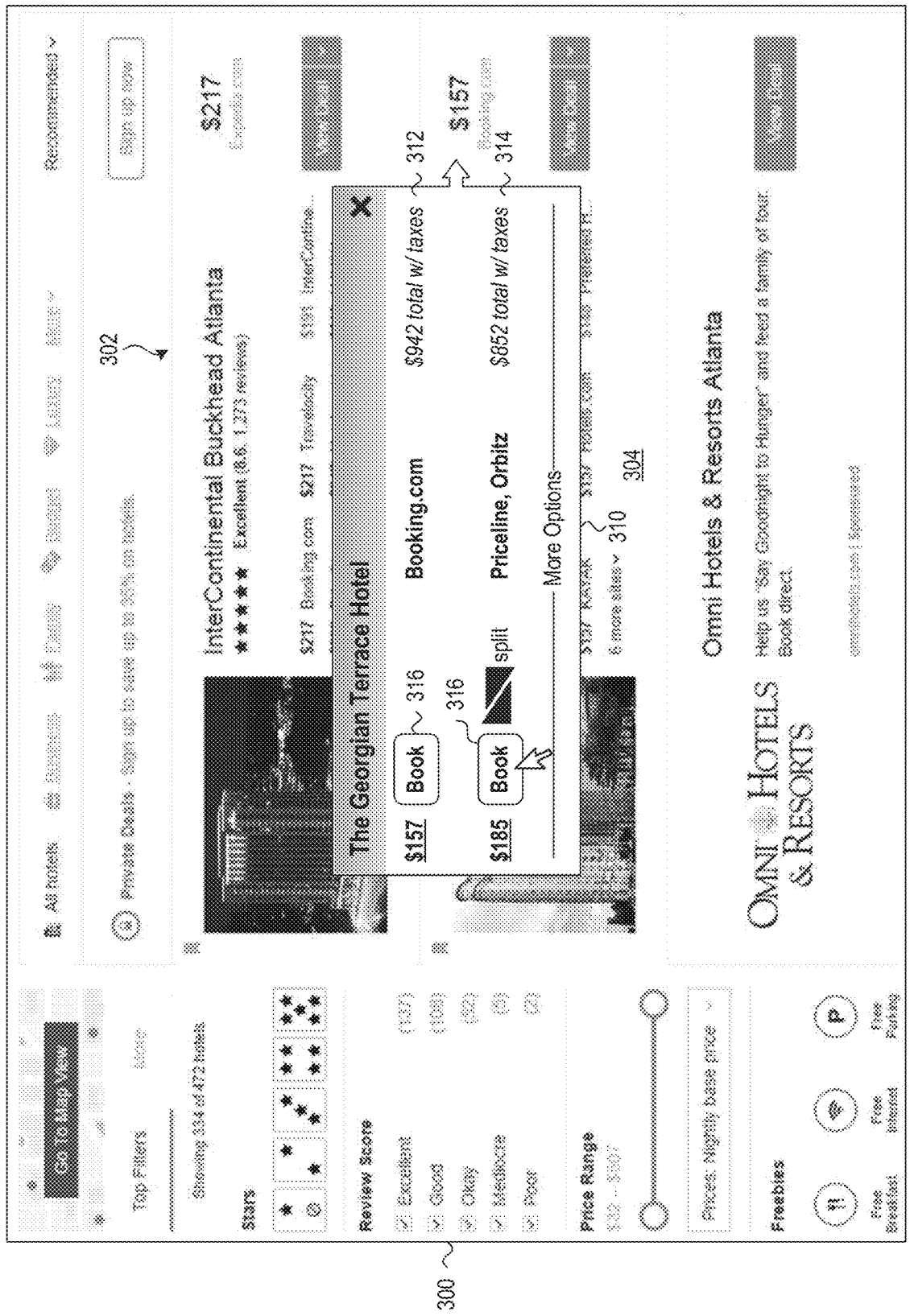
FIG. 3B depicts the example exploration tool implementing another aspect of performing a mixture query and booking a split stay.
Figure 3C:
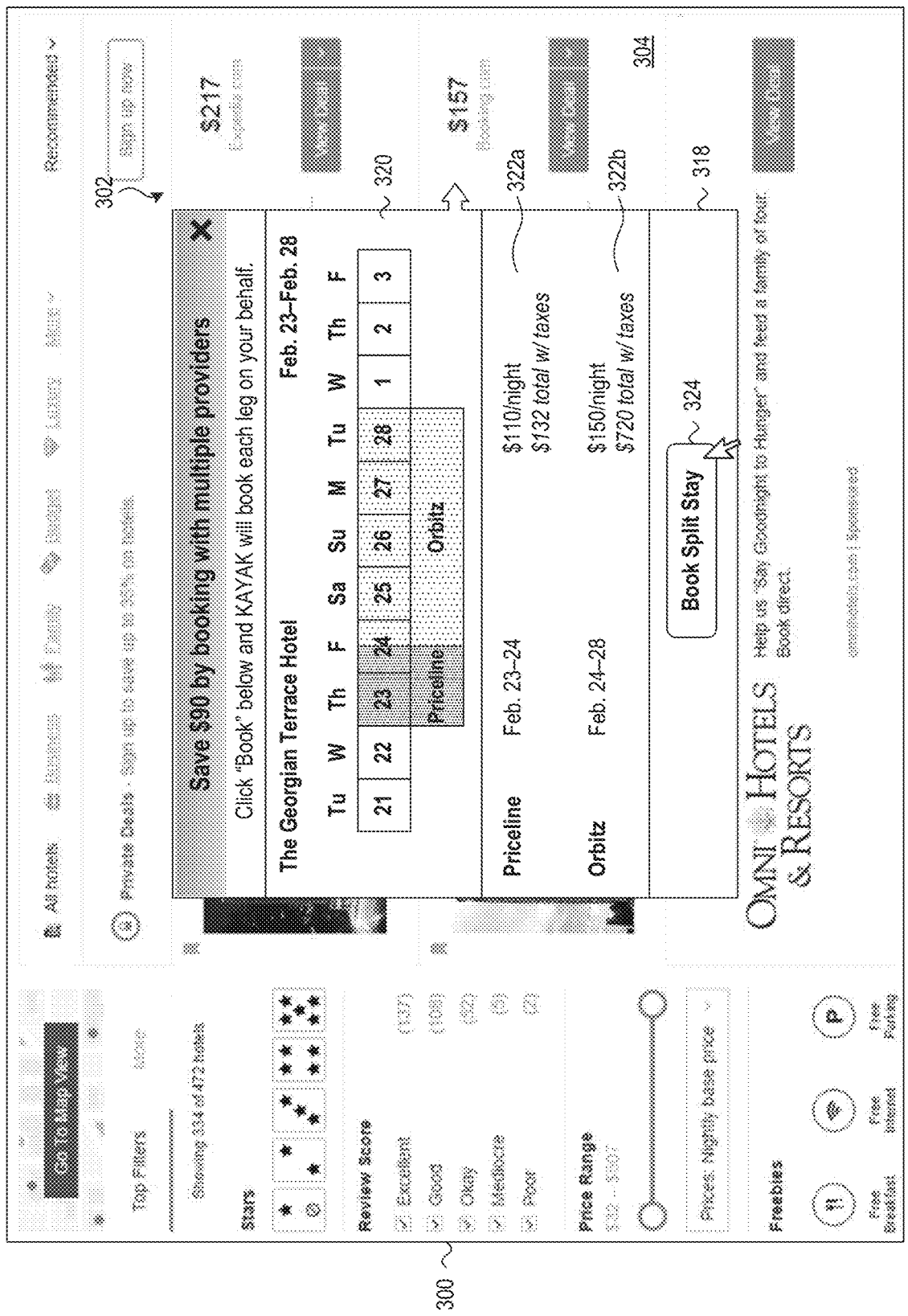
FIG. 3C depicts the example exploration tool implementing another aspect of performing a mixture query and booking a split stay.

FIGS. 3A-C depict an example of an exploration tool 300 configured to search for lodging options and book split stays. The exploration tool 300 depicted in FIGS. 3A-C and described below is configured for operation by a user via a web browser application installed on a desktop or laptop computing device. It should be appreciated, however, that this exploration tool 300 is provided simply to illustrate by way of example and without limitation various principles associated with performing mixture queries and booking split stays. The principles and aspects discussed in further detail below with reference to the example exploration tool 300 may be similarly applied to and/or implemented at other types of client devices (e.g., smartphones, tablet computing devices) providing alternative types of user interfaces (e.g., touch interfaces) in which users access an exploration tool via alternative means (e.g., a mobile application or mobile web browser).

Referring now to FIG. 3A, the exploration tool 300 is shown presenting a list of lodging search results 302 for a stay in Atlanta, Georgia for February 23 through February 28 (i.e., 2/23-2/28). In this example, the second search result 304 ("The Georgian Terrace Hotel") is identified as having a split stay option available. The exploration tool 300, in this example, notifies the user of the available split stay option with a display element 306 associated with the corresponding search result 304. As seen in FIG. 3A, the display element 306 is a dialog overlaid on the list of lodging search results 302 and located in close proximity to the search result 304 for which the split stay option is available. As also seen in FIG. 3A, the display element 306 notifies the user of the calculated savings (e.g., "$90") available by booking the split stay rather than a full stay. The display element 306, in this example, also includes a control element 308 used to obtain details about the available stay options for the search result 304. The control element, in this example, is a link (e.g., "Learn more.") that, when selected, displays the details about the available stay options.

In FIG. 3B, the exploration tool 300 is shown presenting the details about the available stay options. In response to receiving user input at the control element 308 in FIG. 3A, the exploration tool 300 has replaced the display element 306 (FIG. 3A) with a new display element 310 which presents the stay option details. As seen in FIG. 3B, the display element 310, in this example, is likewise a dialog overlaid on the list of lodging search results 302 and located in close proximity to the search result 304. In this example, the stay option details include details for a full stay option 312 (e.g., booked via "Booking.com") as well as a split stay option 314 booked via two different travel service providers (e.g., "Priceline" and "Orbitz"). Each stay option 312-314 includes a control element 316 used to view the details for the respective stay options. In this example, the control element 316 is a button (e.g., "View") that, when selected, displays the details about the selected stay option. Although only two stay options are shown in FIG. 3B, it should be appreciated that the available stay options for a lodging search result may include additional full stay options as well as additional split stay options.

In FIG. 3C, the exploration tool 300 is shown presenting the details about a selected stay option. In response to receiving user input at the control element 316 in FIG. 3B, the exploration tool 300 has replaced the display element 310 (FIG. 3B) with another new display element 318 which present the selected split stay details. As seen in FIG. 3C, the display element 318, in this example, is again a dialog overlaid on the list of lodging search results 302 and located in close proximity to the search result 304. In this example, the selected split stay details include a visual representation 320 of the split stay. The visual representation 320 in FIG. 3C includes a visual timeline of the split stay with each leg of the split stay uniquely shaded according to the travel service provider used to book the split stay (e.g., "Priceline" or "Orbitz"). As seen in FIG. 3C, the visual representation 320 employs relatively darker shading to indicate the first leg of the split stay is booked via "Priceline" with a check-in date of 2/23 and a check-out date of 2/24 and employs relatively lighter shading to indicate the second leg of the split stay is booked via "Orbitz" with a check-in date of 2/24 and a check-out date of 2/28. The display element 318, in this example, also includes details 322a and 322b for each leg of the split stay, e.g., the name of the travel service provider, the check-in/out dates, and the per night rate with and without taxes. The display element 318, in this example, also includes a control element 324 used to book the selected split stay. In this example, the control element 324 is a button (e.g., "Book Split Stay") that, when selected, initiates a booking path used to collect the user's personal information (e.g., name, mailing address, phone number, email address) and payment information (e.g., credit card number and expiration date). Having received the user's personal information and payment information, the exploration tool 300 may initiate the booking of each leg of the selected split stay on behalf of the user as discussed above (e.g., using booking APIs 122 in FIG. 1). Having successfully booked each leg of the selected split stay on behalf of the user, the exploration tool may provide a confirmation message (e.g., displayed on-screen and/or provided via email).

Figure 4:
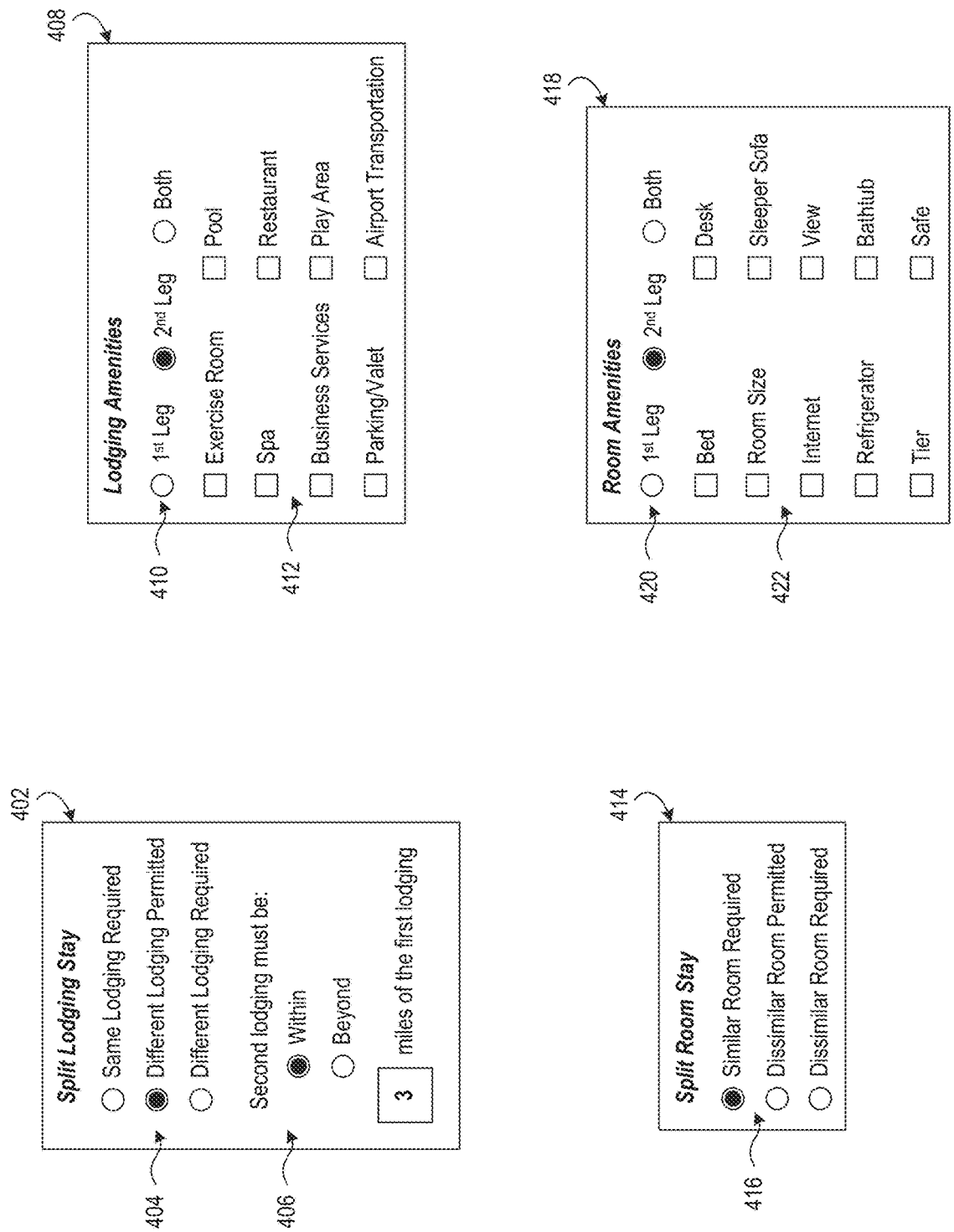
FIG. 4 depicts example control elements that may be employed to perform a mixture search query.

Turning now to FIG. 4, various user interface elements used to specify split stay criteria are shown. These user interface elements may be presented to the user, for example, at an exploration tool (e.g., exploration tool 300 in FIGS. 3A-C) accessed via a webpage and web browser or at a mobile application installed at a user's mobile computing device. FIGS. 3A-C, for example illustrate that the exploration tool provides user interface elements for selecting various stay-related criteria in a sidebar. The user interface elements for specifying split stay criteria may likewise be presented in a sidebar in some example implementations. The user interface elements may also be collapsible to show or hide one or more of the split stay criteria at the user's discretion and/or in response to selections of specific split stay criteria options. Furthermore, the user interface elements illustrated in FIG. 4 are simply provided by way of example to explain various principles associated with searching for and booking split stays. The particular implementation of user interface elements for specifying split stay criteria may depend on the particular platform and/or environment employed. Finally, the specific criteria listed in FIG. 4 is also provided by way of example only, and additional or alternative criteria pertaining to split stays, lodgings, rooms, and amenities may be selectively employed.

As seen in FIG. 4, user interface elements may be presented to the user for specifying split stay criteria associated with a lodging and/or a room. For example, some example implementations may include general lodging criteria 402 pertaining to the lodging for potential split stays. In this example, the general lodging criteria 402 includes criteria 404 for indicating whether the same lodging is required, different lodging is permitted, or different lodging is required for the legs of a potential split stay. The general lodging criteria 402, in this example, also includes criteria 406 for indicating whether subsequent lodging for the split stay must be within or beyond a specified distance of previous lodging for the split stay. Example implementations may also include specific lodging criteria 408 pertaining to the amenities of the lodgings for potential split stays. In this example, the specific lodging criteria 408 includes criteria 410 for indicating whether the subsequently specified lodging amenities must be present for individual legs of a potential split stay (e.g., the first leg or the second leg) or both legs of a potential split stay as well as split stay criteria 412 listing specific lodging amenities individually available for selection (e.g., exercise room, spa, parking). As another example, some example implementations may include general room criteria 414 pertaining to the rooms for potential split stays. In this example, the general room criteria 414 includes criteria 416 for indicating whether a similar room is required, a dissimilar room is permitted, or a dissimilar room is required for the legs of a potential split stay. Example implementations may also include specific room criteria 418 pertaining to the amenities of the rooms for potential split stays. In this example, the specific room criteria 418 includes criteria 420 for indicating whether the subsequently specified room amenities must be present for individual legs of a potential split stay (e.g., the first leg or the second leg) or both legs of a potential split stay as well as split stay criteria 420 listing specific room amenities individually available for selection (e.g., bed, tier, view). It should be appreciated that example implementations may include some or all of the types of split stay criteria illustrated in FIG. 4. In one implementation, for example, an exploration tool may provide user interface elements for specifying both general and specific lodging criteria as well as both general and specific room criteria. In another example implementation, an exploration tool may only provide user interface elements for specifying general and specific room criteria. Additional and alternative examples will be appreciated with the benefit of this disclosure.

Figure 5:
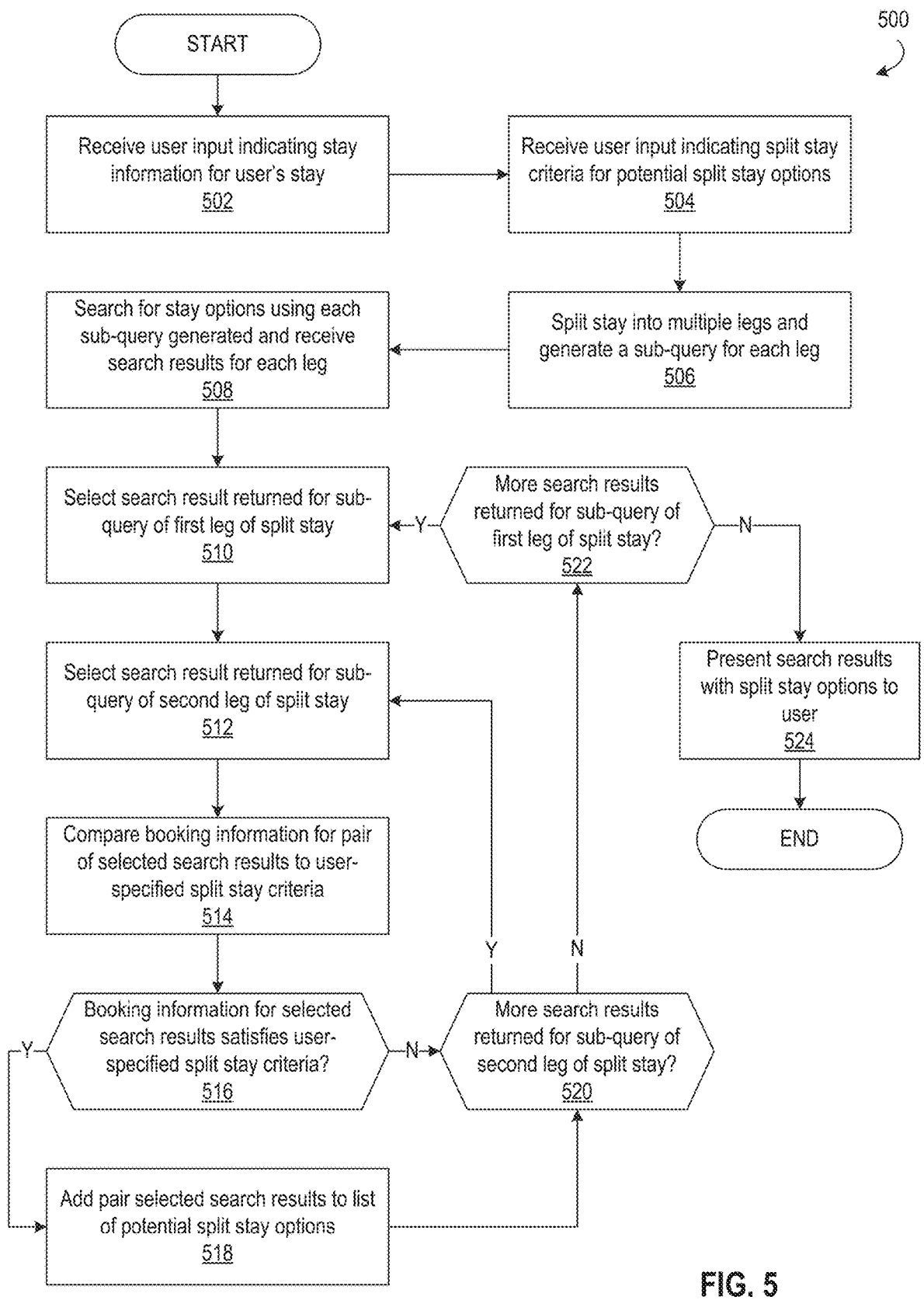
FIG. 5 depicts a flowchart of example method steps for identifying potential split stays from the search results of a mixture query.

Turning now to FIG. 5, a flowchart 500 of example method steps for identifying potential split stays from the search results of a mixture query is shown. The travel search service system 108 of FIG. 1 may perform the steps illustrated in FIG. 5 by executing corresponding mixture query instructions 118. The process of identifying potential split stays starts when the travel search service system 108 receives user input indicating stay information for a desired stay (502) and user input indicating split stay criteria for potential split stay options (504). The stay information and the split stay criteria may be received from the client device 102 in one or more communications transmitted from the client device to the travel search service system 108.

Having receive the stay information and the split stay criteria, the travel search service system 108 splits the stay into multiple legs and generates a sub-query for each leg (506) as described above. The travel search service system 108 then searches for stay options using each sub-query generated and receives respective search results for each leg of the split stay (508). As also described above, the travel search service system 108 may query multiple information sources with the sub-queries, e.g., one or more OTA systems 110, travel service pricing engine systems 112, and/or lodging systems 114. Accordingly, the search results for a leg of a split stay may include respective search results received from multiple information sources. As an example, the search results received by the travel search service system 108 for a first leg of a split stay may include search results received from an OTA system (e.g., "Orbitz") as well as search results received from a lodging system (e.g., "Hilton"), and the search results received for a second leg of a split stay may include search results received from multiple OTA systems (e.g., "Orbitz" and "Priceline"). Additional and alternative examples will be appreciated with the benefit of this disclosure. The search results may include lodging and room information including, for example, a per night rate, lodging amenities, and room amenities.

To identify potential split stay options, the travel search service system 108, in this example, then iteratively evaluates the search results obtained for the legs of the split stay. Here, the travel search service system 108 selects a first search result returned for the first sub-query of the first leg of the split stay (510). The travel search service system 108 then selects a second search results returned for the second sub-query of the second leg of the split stay (512). The travel search service system 108 then compares the booking information for the pair of selected search results to the user-specified split stay criteria (514). Comparing the booking information for the pair of selected search results may include, for example, determining whether their lodging and/or room amenities match user-specified lodging and/or room amenities, determining whether the rooms for the pair of stay options are similar/dissimilar (e.g., using a similarity model to obtain a similarity score for the rooms), determining whether the stay options are for the same/different lodgings, and other types of comparisons that will be appreciated with the benefit of this disclosure. In some example implementations, the process may also include comparing the booking information for the pair of selected search results to hard-coded split stay criteria as described above. If the booking information for the pair of selected search results satisfies the user-specified split stay criteria (516:Y), then the travel search service system 108 may add the pair of selected search results to a list of potential split stay options (518) to be presented to the user.

If the booking information for the pair of selected search results does not satisfy the user-specified split stay criteria (516:N), then that pair of selected search results may be discarded. The travel search service system 108 may then determine whether any search results for the second leg of the split stay remain to be paired with the selected search result for the first leg of the split stay and evaluated. If there remains an additional search result for the second leg of the split stay (520:Y), then the travel search service system 108 may repeat steps 512-516 to pair the next search result for the second leg of the split stay with the selected search result for the first leg of the split stay and determine if that next pair of search results should be added to the list of potential split stay options. If there are no more search results for the second leg of the split stay to pair with the selected search result for the first leg of the split stay (520:N), then the travel search service system 108 may determine whether any search results for the first leg of the split stay remain to be respectively paired with the search results for the second leg of the split stay and evaluated. If there remains an additional search result for the first leg of the split stay (522:Y), then the travel search service system 108 repeats steps 510-516 to pair the next search result for the first leg of the split stay with each of the search results for the second leg of the split stay and determine if any additional pairs of search results should be added to the list of potential split stay options. If there are no more search results for the first leg of the split stay to evaluate (522:N), then the travel search service system 108 presents the list of split stay options to the user (524). As noted above, the travel search service system 108 may also search for full stay options using the stay criteria received from the user and present search results for the full stay options with the split stay options so that the user can compare any price savings resulting from selecting a split stay option in favor of a full stay option.

The steps illustrated in FIG. 5 are provided by way of example only to illustrate one way a travel search service system (e.g., travel search service system 108 in FIG. 1) may identify potential split stays to present to a user. Other ways of identifying potential split stays may be selectively employed in various implementations. For example, in another implementation, a travel search service system may first identify all possible combinations of stay options from the respective search results obtained for the first and second legs of the split stay. The travel search service system may then iterate over this comprehensive list to evaluate each combination of stay options and filter out those that do not satisfy the split stay criteria. For example, the travel search service system may filter out any pairs of stay options that are not cheaper than a particular price threshold (e.g., x % or $x), do not share a common lodging amenity or characteristic, do not share a common room amenity or characteristic, do not satisfy a user-specified split stay criterion, and/or do not satisfy a predetermined (e.g., hard-coded) split stay criterion. Additional examples will be appreciated with the benefit of this disclosure. In short, various approaches may be employed to implement the mixture query instructions used to identify split stays without departing from the underlying principles of identifying potential split stay options to present to a user based on the stay options received in the search results for a mixture query.

Figure 6:
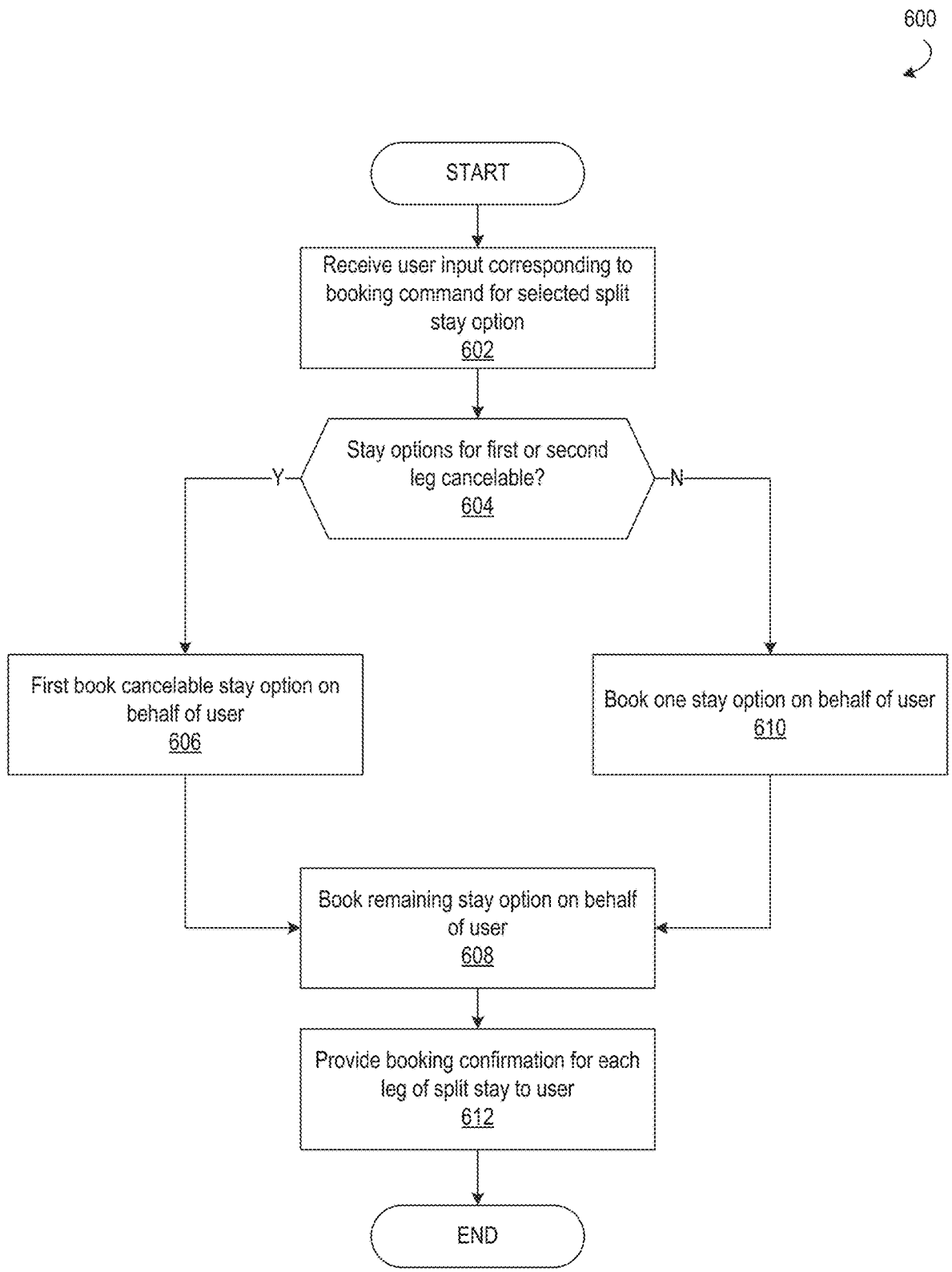
FIG. 6 depicts a flowchart of example method steps for booking a split stay on behalf of a user.
Figure 7:
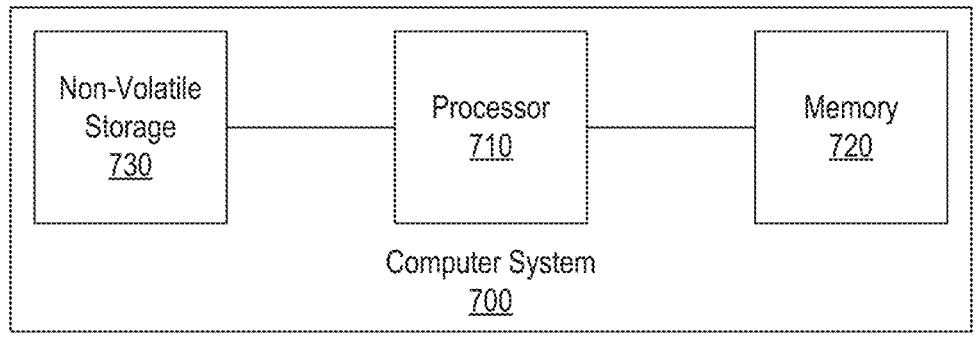
FIG. 7 depicts an example computer on which one or more aspects of the disclosures described herein may be implemented.

Referring now to FIG. 6, a flowchart 600 of example method steps for booking a split stay on behalf of a user is shown. The travel search service system 108 of FIG. 1 may likewise perform the steps illustrated in FIG. 6 by executing corresponding mixture query instructions 118. As set forth above, the travel search service system 108 books a selected split stay on behalf of the user in order to alleviate some of the risks associated with booking a split stay rather than a full stay, e.g., the risk that one of the legs will become unavailable before the user can successfully book both legs of the split stay. To provide further protection to the user, the travel search service system 108 may be configured to book each leg of the split stay in a manner that allows the travel search service system to back out of the booking process should something go wrong during booking. In this regard, the travel search service system 108 may be configured to determine whether any of the stay options for the respective legs of the split stay are cancelable and, if so, book a cancelable stay option before a non-cancelable stay option. In this way, should the travel search service system 108 be unable to successfully complete the booking for the subsequent stay option, the travel search service system 108 can terminate the booking process and cancel the initial stay option without detriment to the user.

The process of booking a split stay on behalf of the user, in this example, begins when the travel search service system 108 receives user input corresponding to a booking command for a selected split stay option (602). The travel search service system 108 then determines whether either of the stay options for the first and second legs is cancelable. If so (604:Y), then the travel search service system 108 first books the cancelable stay option on behalf of the user (606), and then books the remaining stay option on behalf of the user (608). If neither stay option is cancelable (604:N), then the travel search service system 108 books one of the stay options on behalf of the user (610), and then books the remaining stay option on behalf of the user (608). Having successfully booked both stay options for each leg of the split stay, the travel search service system 108 provides the user with booking confirmations for each leg of the split stay (612).

In addition to booking split stays, a travel search service system (e.g., travel search service system 108 in FIG. 1) may be configured to cancel and/or modify split stays that have been booked for a user. A travel search service system may similarly use one or more booking APIs (e.g., booking APIs 122 in FIG. 1) to modify or cancel a booked split stay. In this regard, a booking API may also define the format and content of a modification request or a cancelation request, and the mixture query instructions may be configured to format such requests according to those specifications. In this way, the travel search service system can handle a modification or cancelation of a booked split stay on behalf of a user. The exploration tool (e.g., exploration tool 116 in FIG. 1) may be configured to provide a user with a list of the split stays that have been booked for the user. The exploration tool may also include control elements (e.g., buttons, links) to initiate a modification or cancelation process.

The modification process may include obtaining the user's desired modifications to a booked split stay, determining whether the desired modifications can be made to the booked split stay, and submitting one or more modification requests to an information source (e.g., an OTA system or a lodging system). An example modification may include modifying one or more of the check-in date or the check-out date. Additional and alternative examples will be appreciated with the benefit of this disclosure If the requested modification requires modifying each leg of a split stay, then the travel search service system may submit multiple modification requests (i.e., as many modification requests that may be necessary) to carry out the user's desired modifications. In this way, the user benefits from an efficient approach to modifying the booking details for a split stay involving multiple bookings. For example, after the user provides input indicating the desired modifications, the user may trigger the corresponding modifications to each leg of a split stay with a single command (e.g., a single click).

It will be recognized that, in some circumstances, the modifications a user requests might not be possible. For example, a user may desire to change the check-in date for a first leg of a split stay, but the lodging booked for that leg might not have availability on the new date. A similar problem may arise when a user desires to change the check-out date for a second leg of a split stay. The travel search service system may be configured to employ various approaches in such circumstances. In one approach, the travel search service system may simply inform the user (e.g., via the exploration tool) that the desired modification is not available. In another approach, the travel search service system may suggest or ask whether the user would prefer to cancel the unmodifiable leg of the split stay, search for an alternative stay option for that leg of the split stay, and rebook that leg of the split stay. The user should appreciate, however, that any cost savings derived from booking a split stay initially might not be obtained by using this cancel-and-rebook approach. If the user does wish to cancel and rebook, then the travel search service system may perform a new query based on the desired modifications indicated by the user and present stay options to the user as described above. It will be appreciated that one of the stay options presented to the user as a replacement for an unmodifiable leg of a booked split stay might itself be a split stay. For example, consider a booked split stay for a user that includes a first leg booked for 2/24-2/28 and a second leg booked for 2/28-3/2. If the user desires to modify the check-in date to an earlier check-in date (e.g., 2/22), then the stay options presented to the user as a replacement for the first leg may include a split stay option that includes a first stay option for 2/22-2/26 and a second stay option for 2/26-2/28. If the user selects this split stay option, then the resulting split stay booked for the user will ultimately include three legs: a first leg booked for 2/22-2/26, a second leg booked for 2/26-2/28, and a third leg booked for 2/28-3/2.

With respect to the cancelation process, the travel search service system may similarly handle canceling each leg of a split stay on behalf of the user. The cancelation process may thus include submitting multiple cancelation requests to an information source (e.g., an OTA system or a lodging system). In this way, the user likewise benefits from an efficient approach to canceling a split stay involving multiple bookings. For example, the user may similarly trigger the corresponding cancelations of each leg of a split stay with a single command (e.g., a single click). As noted above, some stay options may not be cancelable once booked. Accordingly, the travel search service system may be configured to cancel, on behalf of the user, whichever bookings are cancelable for a split stay in order to minimize any losses to the user.

It will also be appreciated that additional and alternative examples may be employed with respect to presenting split stay options to a user. As described above with reference to FIG. 3A, a display element (e.g., display element 306) overlaid on the list of search results is used to inform the user that a cheaper split stay option is available. In other implementations, however, split stay options may be presented to the user after the user has selected a full stay. In this way the travel search service system may upsell the user on potential split stay options the user might favor over a full stay option. For example, a user might select a full stay option to review and be presented with one or more split stay options along with the details for the selected full stay option. Here, the split stay options may include a split stay option that is cheaper than the selected full stay option, a split stay option in which the lodging or room characteristics or amenities might be perceived as more desirable to the user, and other examples of split stay options that will be appreciated with the benefit of this disclosure. In some cases, the split stay options presented to the user with the selected full stay option might be more expensive than the full stay option but offer better lodging or room amenities (e.g., a bigger room, located in a different part of town, etc.). Accordingly, a travel search service system may upsell split stay options to the user based on the selected full stay option. In this regard, the travel search service system may be configured to receive a user's selection of a full stay option and, in response, evaluate the lodging and/or room amenities and/or characteristics to identify potential split stay options associated with lodgings and/or rooms having different amenities and/or characteristics. The travel search service system may present any identified split stay options to the user with the details of the selected full stay. The travel search service system may also inform the user of how the user might benefit by selecting the suggested split stay option over the selected full stay option, e.g., "Save $100 by booking a split stay . . . ," "For only $10 more, you can get a bigger room by booking a split stay . . . ," etc. The user may then continue on the booking path for the selected full stay or start a new booking path by selecting one of the suggested split stay options presented.

In some implementations, a travel search service system (e.g., travel search service system 108 in FIG. 1) may be configured to automatically modify a booked split stay or automatically rebook a split stay in response to determining that a better split stay option is available. The identification of a better stay option may be based on a reduction in the price of a stay option in which the characteristics and/or amenities of the lodging and/or room booked for a leg of the split stay might be perceived as better than those for the booked split stay. To illustrate this principle, consider an example in which a user has booked split stay where the rooms for each leg of the split stay are standard rooms. If the travel search service system subsequently identifies that the price of a luxury room for the second leg of the split stay has dropped to be equal to, less than, or within a price difference threshold (e.g., x % or $x) of the price for the second leg of the booked split stay, then the travel search service system may automatically cancel the booking for the second leg of the booked split stay and rebook the user in the luxury room for the second leg of the split stay. Additional examples will be appreciated with the benefit of this disclosure, e.g., rebooking the user in a bigger room, rebooking the user in a room with a better view, rebooking the user in a room with more amenities, etc. In some example implementations, the travel search service system may be configured to automatically rebook a user only if doing so does not incur any rebooking and/or cancelation fees for the user. In addition, in some example implementations, the user may specify rebooking criteria such that the travel search service system automatically rebooks the user only if the user-specified rebooking criteria is satisfied. Example rebooking criteria includes automatically rebooking a user: only if the price of the new stay option is less than or equal to the price of the current booking for the split stay, only if the price of the new stay option is within a user-specified price difference threshold (e.g., x % or $x), if the new stay option has a user-specified lodging amenity or characteristic, if the new stay option has a user-specified room amenity or characteristic, and other example rebooking criteria that will be appreciated with the benefit of this disclosure. Furthermore, a user may specify combinations of rebooking criteria that must be satisfied for the travel search service system automatically rebooks the user (e.g., only if the price of the new stay option is less than the price of the current booking for the split stay AND the new stay option has a user-specified room amenity). Additional and alternative combinations or rebooking criteria will be appreciated with the benefit of this disclosure. Moreover, the rebooking criteria may include the same types of lodging or room amenities or characteristics discussed above with respect to the split stay criteria.

A travel search service system may be configured to perform the rebooking process at regular or irregular intervals. For example, a travel search service system may be configured to perform the rebooking process at off-peak hours (e.g., between 1:00 AM and 4:00 AM). The steps of the rebooking process may include iterating over each split stay that has been booked and determining whether an alternative stay option satisfies the rebooking criteria associated with that split stay. Accordingly, the travel search service system may keep a record of each split stay it books on behalf of a user. The rebooking criteria applied may include user-specified rebooking criteria as discussed above and/or predetermined rebooking criteria (i.e., rebooking criteria hardcoded in the instructions executed by the travel search service system). Predetermined rebooking criteria may include, for example, a requirement that the price for the new stay option be less than or equal to the price of the current booking for the split stay. At each iteration, the travel search service system may select one of the booked split stays, determine the stay information for a leg of the booked split stay, and determine whether a better stay option is available for that leg of the booked split stay by querying for stay options using the booked stay information and determining whether any alternative stay options satisfy the rebooking criteria. The travel search service system may likewise identify alternative stay options by submitting a query with the split stay information to a "live" pricing and availability database and/or one or more information sources (e.g., an OTA system, travel service pricing engine system, or lodging system) as discussed above. At each iteration, the travel search service system may determine whether a better stay option is available for one, some, or all legs of the booked split stay. The travel search service system may then notify a user if it automatically rebooks one or more legs of the user's booked split stay.

Any of the techniques described in the foregoing may be used alone or in any combination, including combinations not specifically described and/or illustrated.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed function. The one or more controller can be implemented in numerous ways, such as with dedicated hardware, or with specially-programmed hardware (e.g., one or more processors) that is programmed using microcode or software to perform the functions described above.

Components of the systems described herein may be implemented using a single computer or functionality may be distributed across multiple computers or servers. In distributed settings, communication among system components/modules/interfaces may be realized in any suitable manner (e.g., wired, wireless, network-based connections) as the present disclosures are not limited in this respect.

It should be appreciated that a computer may be embodied in any of numerous forms, such as a rack-mounted computer, a desktop computer, a laptop computer, or a tablet computer. Additionally, a computer may be embodied in any device with suitable processing capabilities, including a Personal Digital Assistant (PDA), a smart phone or any other suitable portable or fixed electronic device.

Also, a computer may have one or more input and output devices. These devices may be used, among other things, to present a user interface. Examples of output devices that may be used to provide a user interface include printers or display screens for visual presentation of output, and speakers or other sound generating devices for audible presentation of output. Examples of input devices that may be used for a user interface include keyboards, microphones, and pointing devices, such as mice, touch pads, and digitizing tablets.

Such computers may be interconnected by one or more networks in any suitable form, including a local area network (LAN) or a wide area network (WAN), such as an enterprise network, an intelligent network (IN) or the Internet. Such networks may be based on any suitable technology and may operate according to any suitable protocol and may include wireless networks, wired networks, and/or fiber optic networks.

An illustrative implementation of a computer system 700 that may be used in connection with any of the embodiments described herein is shown in FIG. 8. The computer system 700 may be used as the or one of the computer systems comprising the travel search service system, client device and/or the systems of the information sources, and may include one or more processors 710 and one or more non-transitory computer-readable storage media (e.g., memory 720 and/or one or more non-volatile storage media 730). The processor 710 may control writing data to and reading data from the memory 720 and the non-volatile storage device 730 in any suitable manner, as the aspects of the disclosures described herein are not limited in this respect. To perform any of the functionality described herein, the processor 710 may execute one or more instructions stored in one or more computer-readable storage media (e.g., the memory 720), which may serve as non-transitory computer-readable storage media storing instructions for execution by the processor 710.

The various methods or processes, techniques and/or method outlined herein may be coded as software that is executable on one or more processors that employ any one of a variety of operating systems or platforms. Additionally, such software may be written using any of numerous suitable programming languages and/or programming or scripting tools, and also may be compiled as executable machine language code or intermediate code that is executed on a virtual machine or a suitable framework.

In this respect, various inventive concepts may be embodied as at least one computer readable storage medium (e.g., a computer memory, one or more floppy discs, hard discs, compact discs, optical discs, magnetic tapes, flash memories, circuit configurations in Field Programmable Gate Arrays, cache, or other semiconductor devices capable of storing data, etc.) encoded with one or more programs that, when executed on one or more computers or other processors, implement the various aspects of the disclosures described herein. The non-transitory computer-readable medium or media may be transportable, such that the program or programs stored thereon may be loaded onto any computer resource to implement various aspects of the disclosures as discussed above. The term computer readable storage medium is used herein to describe any tangible medium capable of storing data, such as the example media mentioned above, but excludes propagating signals and carrier waves, and the term non-transitory computer readable storage medium is co-extensive in this respect.

The terms "program" or "software" are used herein to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion among different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. The functionality of the program modules may be combined or distributed as desired in various embodiments.

Also, data structures may be stored in non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more methods, of which an example has been provided.

The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

What is claimed is:

1. A computer-implemented method for reserving a lodging, the computer-implemented method comprising:
    determining, by a search service system, a first low network demand period;
    performing, by the search service system and during the first low network demand period, a priming query of a plurality of systems, to obtain a plurality of prices and availabilities associated with a plurality of bookable lodgings, wherein the priming query is not associated with a user query, wherein performing the priming query during the first low network demand period does not increase peak network traffic volume of the plurality of systems;
    storing the plurality of prices and availabilities obtained from the priming query in a pricing and availability database maintained by the search service system;
    receiving, via a user interacting with an interactive graphical user interface (GUI) presented by the search service system, user-specified stay information and one or more criteria;
    selectively executing, by the search service system and based at least in part on receiving the one or more criteria, mixture query instructions, the mixture query instructions logically grouped according to a functionality the mixture query instructions provide when executed by the search service system;
    identifying, using prices and availabilities stored in the pricing and availability database, a split stay that satisfies the user-specified stay information and the one or more criteria, wherein the split stay comprises a first leg and a second leg that are indicated as available or satisfy the one or more criteria;
    determining, from the pricing and availability database, a first source of the first leg of the split stay that satisfies the user-specified stay information and a second source of the second leg of the split stay that satisfies the user-specified stay information;
    determining, from the pricing and availability database, a first price for the first leg and a second price for the second leg of the split stay;
    presenting, by the search service system and via the interactive GUI, the split stay, the first source and the first price of the first leg of the split stay, and the second source and the second price of the first leg of the split stay to the user;
    presenting, by the interactive GUI, a single interface element that, when selected, initiates a first booking of the first leg and a second booking of the second leg of the split stay without redirecting the user to a webpage associated with a lodging provider;
    receiving, from the user and via the interactive GUI, an approval of the split stay;
    accessing, in response to the approval, a first API associated with a first lodging provider offering the first leg of the split stay and accessing a second API associated with a second lodging provider accessing the second leg of the split stay;

transmitting, simultaneously, by the search service system via the first API, a first request to book the first leg of the split stay and transmitting, by the search service system via the second API, a second request to book the second leg of the split stay on behalf of the user;

providing a confirmation of the first booking and the second booking to the user via the interactive GUI;

identifying, by the search service system and during a second low network demand period, an alternative stay option;

determining the alternative stay option satisfies a predetermined rebooking criteria, the predetermined rebooking criteria hardcoded in instructions executed by the search service system; and automatically rebooking, by the search service system and during the second low network demand period, at least one of the first booking or the second booking on behalf of the user and without requesting additional approval from the user based at least in part on the predetermined rebooking criteria.

2. The computer-implemented method of claim 1, wherein the search service system periodically performs additional priming queries to maintain the pricing and availability database.

3. The computer-implemented method of claim 1, wherein the priming query comprises a plurality of queries and wherein the plurality of systems comprises OTA systems, travel service pricing engine systems, and lodging systems.

4. The computer-implemented method of claim 1, wherein the one or more criteria specifies a minimum length for the first booking of the split stay.

5. The computer-implemented method of claim 1, wherein the one or more criteria comprises a first criteria that is specific to the first booking of the first leg of the split stay, and a second criteria, that is specific to the second booking of the second leg of the split stay.

6. The computer-implemented method of claim 1, wherein the first API associated with the first lodging provider receives an approval message from the first lodging provider and, in response, provides payment information associated with the user to the first lodging provider.

7. A non-transitory, computer-readable storage medium that comprises instructions that, when executed by at least one processor, cause the at least one processor to perform operations for reserving a lodging, the operations comprising:

determining, by a search service system, a first low network demand period;

performing, by the search service system and during the first low network demand period, a priming query of a plurality of systems, to obtain a plurality of prices and availabilities associated with a plurality of bookable lodgings, wherein the priming query is not associated with a user query, wherein performing the priming query during the first low network demand period does not increase peak network traffic volume of the plurality of systems;

storing the plurality of prices and availabilities obtained from the priming query in a pricing and availability database maintained by the search service system;

receiving, via a user interacting with an interactive graphical user interface (GUI) presented by the search service system, user-specified stay information and one or more criteria;

selectively executing, by the search service system and based at least in part on receiving the one or more criteria, mixture query instructions, the mixture query instructions logically grouped according to a functionality the mixture query instructions provide when executed by the search service system;

identifying, using prices and availabilities stored in the pricing and availability database, a split stay that satisfies the user-specified stay information and the one or more criteria, wherein the split stay comprises a first leg and a second leg that are indicated as available or satisfy the one or more criteria;

determining, from the pricing and availability database, a first source of the first leg of the split stay that satisfies the user-specified stay information and a second source of the second leg of the split stay that satisfies the user-specified stay information;

determining, from the pricing and availability database, a first price for the first leg and a second price for the second leg of the split stay;

presenting, by the search service system and via the interactive GUI, the split stay, the first source and the first price of the first leg of the split stay, and the second source and the second price of the first leg of the split stay to the user;

presenting, by the interactive GUI, a single interface element that, when selected, initiates a first booking of the first leg and a second booking of the second leg of the split stay without redirecting the user to a webpage associated with a lodging provider;

receiving, from the user and via the interactive GUI, an approval of the split stay;

accessing, in response to the approval, a first API associated with a first lodging provider offering the first leg of the split stay and accessing a second API associated with a second lodging provider accessing the second leg of the split stay;

transmitting, simultaneously, by the search service system via the first API, a first request to book the first leg of the split stay and transmitting, by the search service system via the second API, a second request to book the second leg of the split stay on behalf of the user;

providing a confirmation of the first booking and the second booking to the user via the interactive GUI;

identifying, by the search service system and during a second low network demand period, an alternative stay option;

determining the alternative stay option satisfies a predetermined rebooking criteria, the predetermined rebooking criteria hardcoded in instructions executed by the search service system; and automatically rebooking, by the search service system and during the second low network demand period, at least one of the first booking or the second booking on behalf of the user and without requesting additional approval from the user based at least in part on the predetermined rebooking criteria.

8. The non-transitory, computer-readable storage medium of claim 7, wherein the search service system periodically performs additional priming queries to maintain the pricing and availability database.

9. The non-transitory, computer-readable storage medium of claim 7, wherein the priming query comprises a plurality of queries directed at OTA systems, travel service pricing engine systems, and lodging systems.

10. The non-transitory, computer-readable storage medium of claim 7, wherein the one or more criteria specifies a minimum length for the first booking of the first leg of the split stay.

11. The non-transitory, computer-readable storage medium of claim 7, wherein the one or more criteria comprises a first criteria that is specific to the first booking of the split stay, and a second criteria, that is specific to the second booking of the split stay.

12. The non-transitory, computer-readable storage medium of claim 7, wherein the first API associated with the first lodging provider receives an approval message from the first lodging provider and, in response, provides payment information associated with the user to the first lodging provider.

13. A system for reserving a lodging the system comprising:
one or more processors;
one or more tangible, non-transitory computer-readable media operably connectable to one or processors and storing instructions that, when executed, cause the one or more processors to perform operations comprising:
determining, by a search service system, a first low network demand period;
performing, by the search service system and during the first low network demand period, a priming query of a plurality of systems, to obtain a plurality of prices and availabilities associated with a plurality of bookable lodgings, wherein the priming query is not associated with a user query, wherein performing the priming query during the first low network demand period does not increase peak network traffic volume of the plurality of systems;
storing the plurality of prices and availabilities obtained from the priming query in a pricing and availability database maintained by the search service system;
receiving, via a user interacting with an interactive graphical user interface (GUI) presented by the search service system, user-specified stay information and one or more criteria;
selectively executing, by the search service system and based at least in part on receiving the one or more criteria, mixture query instructions, the mixture query instructions logically grouped according to a functionality the mixture query instructions provide when executed by the search service system;
identifying, using prices and availabilities stored in the pricing and availability database, a split stay that satisfies the user-specified stay information and the one or more criteria, wherein the split stay comprises a first leg and a second leg that are indicated as available or satisfy the one or more criteria;
determining, from the pricing and availability database, a first source of the first leg of the split stay that satisfies the user-specified stay information and a second source of the second leg of the split stay that satisfies the user-specified stay information;
determining, from the pricing and availability database, a first price for the first leg and a second price for the second leg of the split stay;
presenting, by the search service system and via the interactive GUI, the split stay, the first source and the first price of the first leg of the split stay, and the second source and the second price of the first leg of the split stay to the user;
presenting, by the interactive GUI, a single interface element that, when selected, initiates a first booking of the first leg and a second booking of the second leg of the split stay without redirecting the user to a webpage associated with a lodging provider;
receiving, from the user and via the interactive GUI, an approval of the split stay;
accessing, in response to the approval, a first API associated with a first lodging provider offering the first leg of the split stay and accessing a second API associated with a second lodging provider accessing the second leg of the split stay;
transmitting, simultaneously, by the search service system via the first API, a first request to book the first leg of the split stay and transmitting, by the search service system via the second API, a second request to book the second leg of the split stay on behalf of the user;
providing a confirmation of the first booking and the second booking to the user via the interactive GUI;
identifying, by the search service system and during a second low network demand period, an alternative stay option;
determining the alternative stay option satisfies a predetermined rebooking criteria, the predetermined rebooking criteria hardcoded in instructions executed by the search service system; and
automatically rebooking, by the search service system and during the second low network demand period, at least one of the first booking or the second booking on behalf of the user and without requesting additional approval from the user based at least in part on the predetermined rebooking criteria.

14. The system of claim 13, wherein the search service system periodically performs additional priming queries to maintain the pricing and availability database.

15. The system of claim 13, wherein the priming query comprises a plurality of queries and wherein the plurality of systems comprises OTA systems, travel service pricing engine systems, and lodging systems.

16. The system of claim 13, wherein the one or more criteria comprises a first criteria that is specific to the first booking of the split stay, and a second criteria, that is specific to the second booking of the split stay.

17. The system of claim 13, wherein the first API associated with the first lodging provider receives an approval message from the first lodging provider and, in response, provides payment information associated with the user to the first lodging provider.

18. The computer-implemented method of claim 1, wherein the mixture query instructions comprise a first set of instructions for splitting a search query into multiple sub-queries, a second set of instructions for executing the multiple sub-queries, a third set of instructions for pairing stay options for each leg of a potential split stay based on search results for the sub-queries, a fourth set of instructions for providing the search results that include split stay options, and a fifth set of instructions for booking a selected split stay on behalf of the user.

19. The computer-implemented method of claim 1, wherein the mixture query instructions are programmed to be executed by a single application server computing device.

20. The computer-implemented method of claim 1, wherein the rebooking criteria comprises a requirement that the alternative stay option includes a user-specified lodging amenity or characteristic.

* * * * *